US011602096B2

(12) United States Patent
Schoeny et al.

(10) Patent No.: US 11,602,096 B2
(45) Date of Patent: Mar. 14, 2023

(54) METHODS AND RELATED SYSTEMS FOR AUTOMATICALLY CALIBRATING SEED METERS

(71) Applicant: CNH Industrial America LLC, New Holland, PA (US)

(72) Inventors: Christopher Schoeny, Minooka, IL (US); Chad M. Johnson, Arlington Heights, IL (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 893 days.

(21) Appl. No.: 16/506,467

(22) Filed: Jul. 9, 2019

(65) Prior Publication Data
US 2021/0007271 A1 Jan. 14, 2021

(51) Int. Cl.
*A01C 7/10* (2006.01)
*G01L 21/00* (2006.01)

(52) U.S. Cl.
CPC .............. *A01C 7/107* (2013.01); *G01L 21/00* (2013.01)

(58) Field of Classification Search
CPC .. A01C 7/107; A01C 7/10; A01C 7/08; A01C 7/00; G01L 21/00
See application file for complete search history.

(56) References Cited

U.S. PATENT DOCUMENTS

| 7,086,269 | B2 | 8/2006 | Sauder et al. |
| 7,478,603 | B2 | 1/2009 | Riewerts et al. |
| 7,717,048 | B2 | 5/2010 | Peterson, Jr. et al. |

(Continued)

FOREIGN PATENT DOCUMENTS

| CN | 2664358 | 12/2004 |
| CN | 103270837 | 9/2013 |

(Continued)

OTHER PUBLICATIONS

Devin L. Mangus et al., "Development of High-Speed Camera Hardware and Software Package to Evaluate Real-Time Electric Seed Meter Accuracy of a Variable Rate Planter," Computers and Electronics in Agriculture, vol. 142, Part A, Nov. 2017 (3 pages) https://www.sciencedirect.com/science/article/pii/S0168169916309760.

(Continued)

*Primary Examiner* — Christopher J. Novosad
(74) *Attorney, Agent, or Firm* — Rebecca Henkel; Rickard Demille

(57) ABSTRACT

In one aspect, a calibration method for a seed meter may include controlling an air pressure source to apply an initial air pressure to a seed transport member of the seed meter defining a plurality of seed cells. The method may further include controlling the seed meter to rotate the seed transport member relative to a seed chamber of the seed meter containing a plurality of seeds. The method may additionally include performing a calibration cycle for the seed meter, which may include monitoring a first parameter indicative of a number of empty seed cells as the seed transport member rotates, iteratively adjusting the air pressure from the initial air pressure as the first parameter is being monitored, and when the first parameter crosses a first threshold, recording the associated air pressure as a minimum air pressure for the seed meter.

20 Claims, 15 Drawing Sheets

(56) References Cited

U.S. PATENT DOCUMENTS

| | | |
|---|---|---|
| 8,418,636 B2 | 4/2013 | Liu et al. |
| 8,473,168 B2 | 6/2013 | Goldman et al. |
| 8,516,969 B2 | 8/2013 | Wendte et al. |
| 8,925,471 B2 | 1/2015 | Adams et al. |
| 8,942,896 B2 | 1/2015 | Mayerle |
| 9,179,594 B2 | 11/2015 | Graham |
| 9,426,940 B2 | 8/2016 | Connors et al. |
| 9,578,799 B2 | 2/2017 | Allgaier et al. |
| 9,585,303 B2 | 3/2017 | Rylander |
| 9,603,298 B2 | 3/2017 | Wendte et al. |
| 9,675,002 B2 | 6/2017 | Roszman |
| 9,730,377 B2 | 8/2017 | Chuk |
| 9,733,634 B2 | 8/2017 | Prickel |
| 9,807,923 B2 | 11/2017 | Wilhelmi et al. |
| 10,045,478 B2 | 8/2018 | Posselius |
| 2016/0366814 A1* | 12/2016 | Roszman .............. A01C 7/046 |
| 2017/0172057 A1 | 6/2017 | Rylander |
| 2018/0325017 A1 | 11/2018 | Schoeny et al. |
| 2019/0037765 A1 | 2/2019 | Bartelson et al. |

FOREIGN PATENT DOCUMENTS

| | | |
|---|---|---|
| CN | 104488419 | 4/2015 |
| CN | 206442685 U | 8/2017 |
| CN | 108293372 | 7/2018 |
| WO | WO2015094108 | 6/2015 |

OTHER PUBLICATIONS

"SeedStar 4 Planter Quick Reference Guide," John Deere, 2017 (16 pages) https://www.deere.com/assets/pdfs/common/parts-and-service/manuals-training/qrga110886_01nov17.pdf.

* cited by examiner

METHODS AND RELATED SYSTEMS FOR AUTOMATICALLY CALIBRATING SEED METERS

FIELD OF THE INVENTION

The present subject matter relates generally to seed meters and, more particularly, to a method for automatically calibrating components of a seed meter.

BACKGROUND OF THE INVENTION

A planting implement has a plurality of row units, each row unit having at least one seed meter which dispenses seeds in a relatively controllable manner via a seed transport member of the seed meter. The seed transport member has an array of seed cells defined around its outer perimeter region. As the seed transport member rotates within the housing of the seed meter, each individual seed cell completes repeated rotations around the housing of the seed meter. During each rotation, each particular seed cell will pass through different regions of the seed meter. When passing through the seed pool of the seed meter, each seed cell typically acquires at least one seed during normal operation of the seed meter.

Air pressure, such as negative or positive air pressure supplied by an air system having an air pressure source associated with the seed meter, may be applied to the seed transport member to help pick up and hold seeds within the seed cells. Typically, the air pressure may be set based on predetermined or recommended ranges provided by a seed company or seed meter manufacturer for a seed meter model and/or a seed type. However, due to slight variations between seed meters of the same model or variations in seed lots, for example, such estimated ranges may not be ideal. In instances where the air pressure is not sufficient, excessive skips in the seed meter may occur. Conversely, in instances where the air pressure is too high, excessive multiples in the seed meter may occur. Such problems may reduce the efficiency of the implement and may also affect crop yields.

Additionally, a singulator is typically provided for use in a seed meter to reduce the number of occurrences of seed multiples in seed cells before delivery. Typically, the aggressiveness of the singulator may be set according to predetermined or recommended ranges for each seed meter model and each seed type, e.g., as provided by a seed company or seed meter manufacturer. However, due to slight variations between seed meters, or variations in seed lots, such ranges may not be ideal. In instances where the singulator aggressiveness is set too high, skips may occur. Conversely, in instances where the singulator aggressiveness is set too low, excessive multiples may still occur.

Accordingly, a method for automatically calibrating the air pressure of an air pressure source and the aggressiveness of a singulator for a given seed meter would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a calibration method for a seed meter of an agricultural implement. The method includes controlling, with a computing device, an operation of an air pressure source for a seed meter to apply an initial air pressure to a seed transport member of the seed meter, where the seed transport member defines a plurality of seed cells. The method further includes controlling, with the computing device, an operation of the seed meter to rotate the seed transport member relative to a seed chamber of the seed meter, with the seed chamber containing a plurality of seeds. Additionally, the method includes performing, with the computing device, a calibration cycle for the seed meter. The calibration cycle includes monitoring, with the computing device, a first parameter indicative of a number of empty seed cells of the plurality of seed cells as the seed transport member is rotated relative to the seed chamber. The calibration cycle further includes iteratively adjusting, with the computing device, the vacuum pressure applied to the seed transport member from the initial vacuum pressure as the first parameter is being monitored. Additionally, when it is detected that the first parameter crosses a first threshold, the calibration cycle includes recording, with the computing device, the associated vacuum pressure as a minimum vacuum pressure for the seed meter.

In another aspect, the present subject matter is directed to another embodiment of a calibration method for a seed meter of an agricultural implement. The method includes controlling, with a computing device, an operation of a vacuum source for a seed meter to apply an initial vacuum pressure to a seed transport member of the seed meter, with the seed transport member defining a plurality of seed cells. The method further includes controlling, with the computing device, an operation of the seed meter to rotate the seed transport member relative to a seed chamber of the seed meter, where the seed chamber contains a plurality of seeds. Additionally, the method includes performing, with the computing device, an initial calibration cycle for the seed meter. The initial calibration cycle includes monitoring, with the computing device, a first parameter indicative of a number of empty seed cells of the plurality of seed cells as the seed transport member is rotated relative to the seed chamber. The initial calibration cycle further includes monitoring, with the computing device, a second parameter indicative of a number of occurrences of seed multiples associated with operation of the seed meter as the seed transport member is rotated relative to the seed chamber. Further still, the initial calibration cycle includes iteratively adjusting, with the computing device, the vacuum pressure applied to the seed transport member from the initial vacuum pressure as the first and second parameters are being monitored. Additionally, the initial calibration cycle includes recording, with the computing device, at least one vacuum pressure applied to the seed transport member that is associated with at least one of the first parameter or the second parameter crossing a predetermined threshold defined for the at least one of the first parameter or the second parameter as the vacuum pressure is iteratively adjusted.

In a further aspect, the present subject matter is directed to an additional embodiment of a calibration method for a seed meter of an agricultural implement. The method includes controlling, with a computing device, an operation of a vacuum source for a seed meter to apply an initial vacuum pressure to a seed transport member of the seed meter, where the seed transport member defines a plurality of seed cells. The method further includes controlling, with the computing device, an operation of a singulator of a seed meter to apply an initial aggressiveness setting for the singulator. Further, the method includes controlling, with the computing device, an operation of the seed meter to rotate the seed transport member relative to a seed chamber of the seed meter, with the seed chamber containing a plurality of seeds. Additionally, the method includes performing, with the computing device, an initial calibration cycle for the seed meter. The initial calibration cycle includes monitoring, with the computing device, a first parameter indicative of a number of empty seed cells of the plurality of seed cells as the seed transport member is rotated relative to the seed chamber. The initial calibration cycle further includes monitoring, with the computing device, a second parameter indicative of a number of occurrences of seed multiples associated with operation of the seed meter as the seed transport member is rotated relative to the seed chamber. Moreover, the initial calibration cycle includes incrementally adjusting, with the computing device, the vacuum pressure from the initial vacuum pressure applied to the seed transport member while the first parameter is being monitored. Further, the initial calibration cycle includes incrementally adjusting, with the computing device, the aggressiveness setting from the initial aggressiveness setting for the singulator while the second parameter is being monitored and while the minimum vacuum pressure is applied. Further, the initial calibration cycle includes recording, with the computing device, the vacuum pressure applied to the seed transport member that is associated with the first parameter crossing a predetermined threshold defined for the first parameter and the second parameter crossing a predetermined threshold for the second parameter as a minimum vacuum pressure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
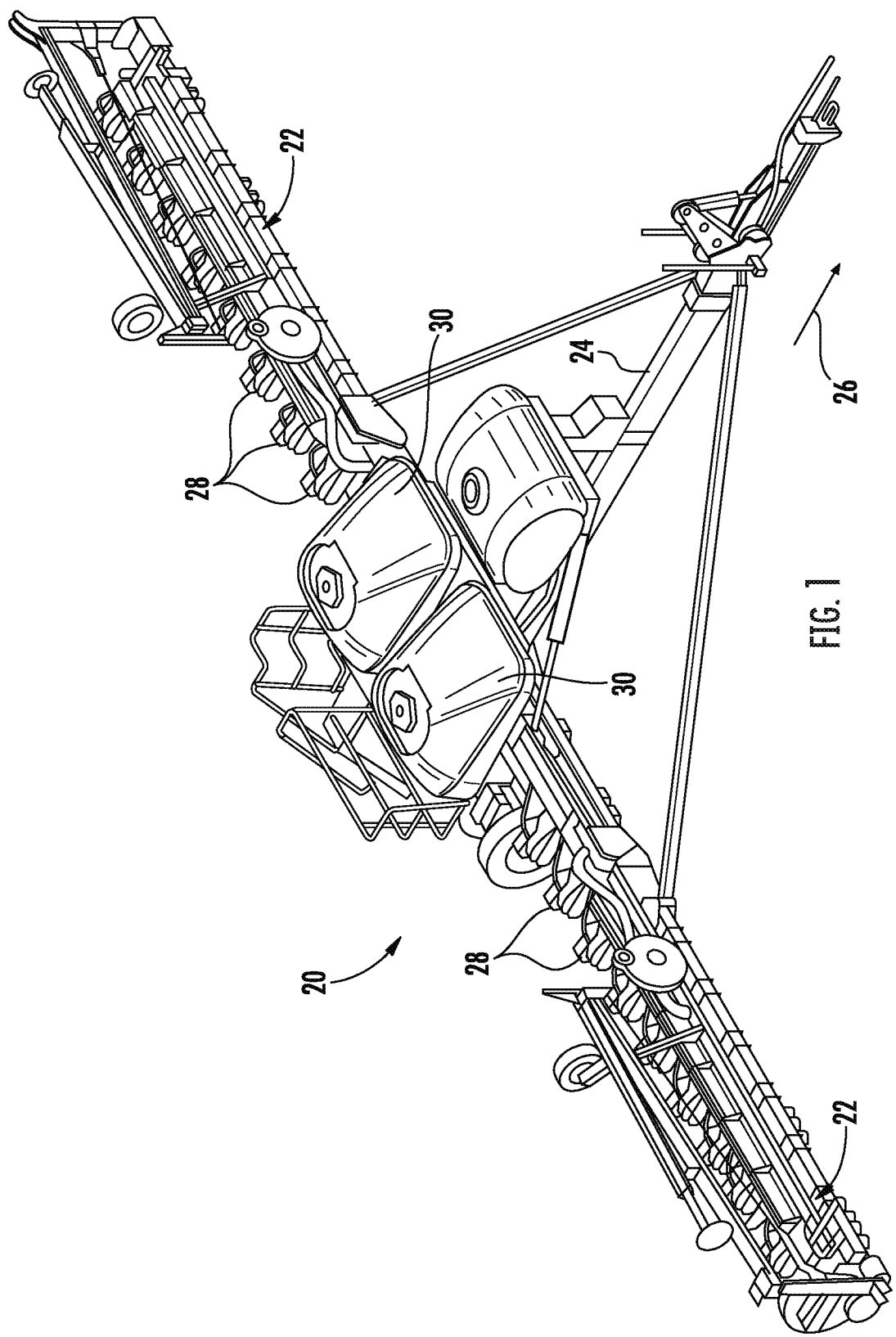
FIG. 1 illustrates a perspective view of one embodiment of a planter in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to methods and related systems for calibrating a vacuum source for a seed meter as well as an associated singulator of the seed meter. In several embodiments, the disclosed system includes a controller communicatively coupled to one or more sensors configured to detect the presence or absence of seeds within the seed cells of a seed transport member of the seed meter and/or the number of seeds discharged from the seed transport member of the seed meter. Additionally, the controller may be communicatively coupled to suitable components for controlling both the vacuum source and the singulator associated with the seed meter.

The controller may be configured to run calibration cycles to automatically calibrate the vacuum source and the singulator based on signals received from the various sensors. For example, in one embodiment, the controller may incrementally increase the vacuum pressure supplied by the vacuum source from a lowest vacuum pressure setting until the number of empty cells or "skips" detected by at least one of the sensors reaches or falls below an allowable skips threshold to establish a minimum vacuum pressure for the seed meter. The controller may further iteratively increase the vacuum pressure until the number of occurrences of "seed multiples" (e.g., seed doubles, triples, etc.) detected by at least one sensor is greater than an allowable multiples threshold to establish a maximum vacuum pressure for the seed meter. Similarly, the controller may calibrate the singulator by controlling the singulator to start at an aggressiveness setting within a passive range of aggressiveness settings of the singulator, in which seeds are unlikely to be knocked off of the seed transport member, and to subsequently iteratively increase the aggressiveness of the singulator until the number of occurrences of seed multiples detected by the discharge sensor falls below the allowable multiples threshold to establish a minimum aggressiveness setting for the seed meter. The controller may further iteratively increase the aggressiveness of the singulator until the number of skips detected by the presence sensor is greater than the allowable skips threshold to establish a maximum aggressiveness setting for the seed meter.

In some embodiments, the controller may repeat the calibration cycles any number of times to determine more accurate ranges. Additionally or alternatively, in some embodiments, the controller may perform one or more reverse calibration cycles to better account for hysteresis effects in which the controller may iteratively decrease the vacuum pressure and/or aggressiveness of the singulator.

Additionally, in some embodiments, the controller may first determine at least a minimum vacuum pressure and a minimum aggressiveness setting for the singulator and then further determine a maximum aggressiveness setting for the singulator while the determined minimum vacuum pressure is applied to the seed transport member. Similarly, in some embodiments, the controller may first determine at least a minimum vacuum pressure and a minimum aggressiveness setting for the singulator and then further determine a maximum vacuum pressure for the vacuum source while the determined minimum aggressiveness setting is applied. Alternatively or additionally, in one embodiment, the controller may determine a number of skips and/or a number of occurrences of seed multiples for a plurality of combinations of different vacuum pressure settings and singulator aggressiveness settings to determine at least one desired combination of vacuum pressure setting and singulator aggressiveness setting and/or to determine a relationship between vacuum pressure and singulator aggressiveness settings.

Referring now to drawings, FIG. 1 illustrates a perspective view of one embodiment of a planting implement or planter 20 in accordance with aspects of the present subject matter. As shown in FIG. 1, the planter 20 may include a laterally extending toolbar or frame assembly 22 connected at its middle to a forwardly extending tow bar 24 to allow the planter 20 to be towed by a work vehicle (not shown), such as an agricultural tractor, in a direction of travel (e.g., as indicated by arrow 26). The frame assembly 22 may generally be configured to support a plurality of seed planting units (or row units) 28. As is generally understood, each row unit 28 may be configured to deposit seeds at a desired depth beneath the soil surface and at a desired seed spacing as the planter 20 is being towed by the work vehicle, thereby establishing rows of planted seeds. In some embodiments, the bulk of the seeds to be planted may be stored in one or more seed tanks 30. Thus, as seeds are planted by the row units 28, a pneumatic distribution system may distribute additional seeds from the seed tanks 30 to the individual row units 28. Additionally, as will be described below, each row unit 28 may also include one or more individual seed hoppers for locally storing seeds at the row unit 28.

It should be appreciated that, for purposes of illustration, only a portion of the row units 28 of the planter 20 have been shown in FIG. 1. In general, the planter 20 may include any number of row units 28, such as 6, 8, 12, 16, 24, 32, or 36 row units. In addition, it should be appreciated that the lateral spacing between row units 28 may be selected based on the type of crop being planted. For example, the row units 28 may be spaced approximately 30 inches from one another for planting corn, and approximately 15 inches from one another for planting soybeans.

It should also be appreciated that the configuration of the planter 20 described above and shown in FIG. 1 is provided only to place the present subject matter in an exemplary field of use. Thus, it should be appreciated that the present subject matter may be readily adaptable to any manner of planter configuration.

Figure 2:
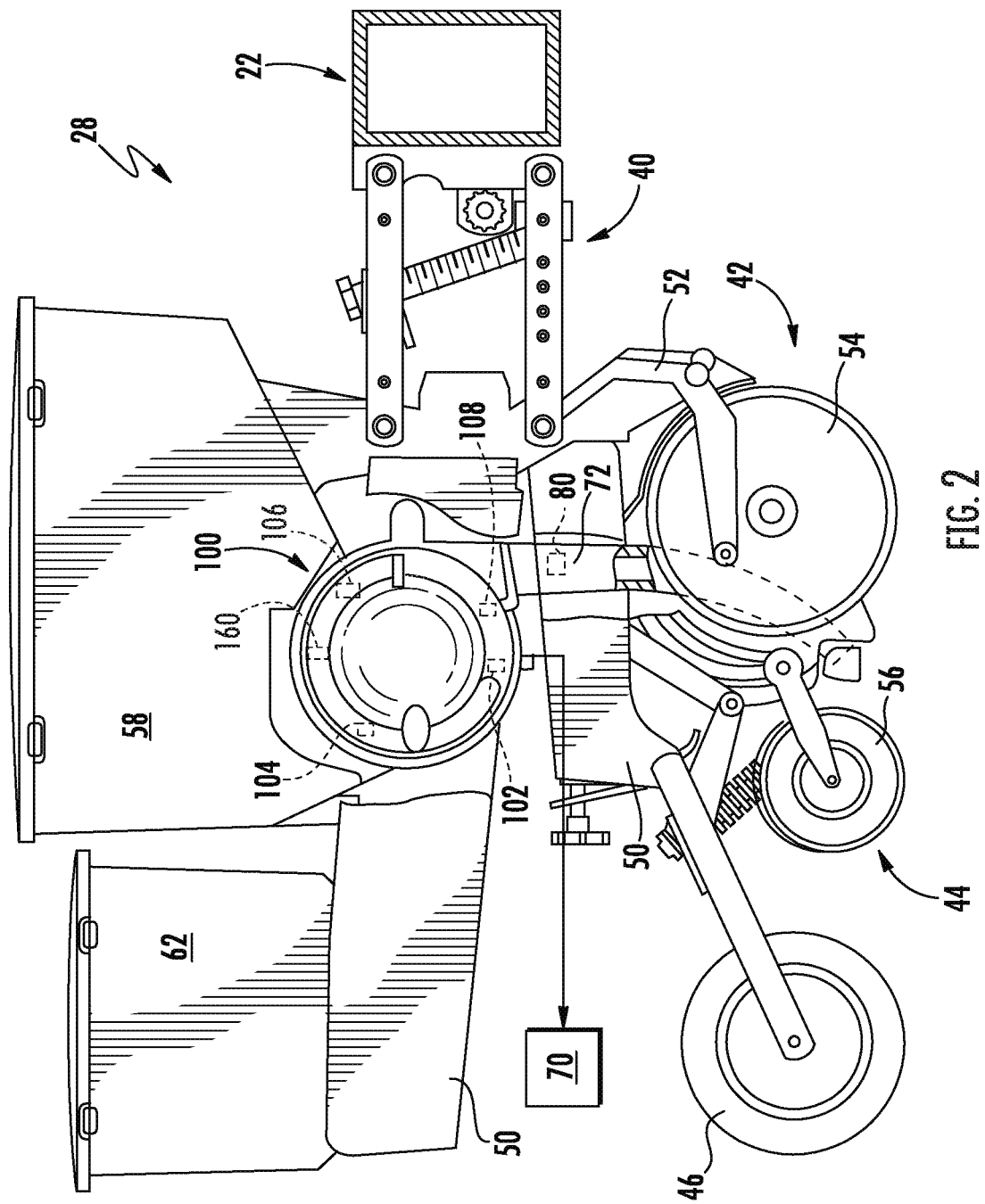
FIG. 2 illustrates a side view of one embodiment of a row unit suitable for use with a planter in accordance with aspects of the present subject matter.

Referring now to FIG. 2, a side view of one embodiment of a row unit 28 is illustrated in accordance with aspects of the present subject matter. As shown, the row unit 28 includes a linkage assembly 40 configured to mount the row unit 28 to the toolbar or frame assembly 22 of the planter 20. As shown in FIG. 2, the row unit 28 also includes a furrow opening assembly 42, a furrow closing assembly 44, and a press wheel 46. In general, the furrow opening assembly 42 may include a gauge wheel (not shown) operatively connected to a frame 50 of the row unit 28 via a support arm 52. Additionally, the opening assembly 42 may also include one or more opening disks 54 configured to excavate a furrow, or trench, in the soil. As is generally understood, the gauge wheel may be configured to engage the surface of the field, with the height of the opening disk(s) 54 being adjusted with respect to the position of the gauge wheel to set the desired depth of the furrow being excavated. Moreover, as shown, the furrow closing assembly 44 may include a closing disk(s) 56 configured to close the furrow after seeds have been deposited into the furrow. The press wheel 46 may then be configured to roll over the closed furrow to firm the soil over the seed and promote favorable seed-to-soil contact.

Additionally, as shown in FIG. 2, the row unit 28 may include one or more seed hoppers 58 and, optionally, a granular chemical product hopper 62 supported on the frame 50. In general, the seed hopper(s) 58 may be configured to store seeds to be gravitationally deposited within the furrow as the row unit 28 moves over and across the field. In some embodiments, each seed hopper 58 may store a different seed type. Alternatively, a single seed hopper may be used to store more than one type of seed. For example, a single seed hopper may be internally divided (e.g., via a divider wall(s)) so as to define separate seed chambers or compartments for storing differing seed types.

Moreover, the row unit 28 may include a seed meter 100 provided in operative association with the seed hopper(s) 58. In general, the seed meter 100 may be configured to uniformly release seeds received from the seed hopper(s) 58 for deposit within the furrow. For instance, the seed meter 100 may be coupled to a suitable air pressure source 70 (e.g., a vacuum or a blower powered by a motor and associated tubing or hoses) configured to generate a pressure (negative or positive) that attaches the seeds to a rotating seed transport member (e.g., a seed disk) of the seed meter 100, which controls the rate at which the seeds are output from the seed meter 100 to an associated seed tube 72 (or other seed delivery mechanism). As shown in FIG. 2, the seed tube 72 may extend vertically between the seed meter 100 and the ground to facilitate delivery of the seeds output from the seed meter 100 to the furrow. It should be appreciated that, while the seeds in the seed transport member 116 of the seed meter 100 will be discussed herein as being under vacuum or negative pressure from the air pressure source 70, configured as a vacuum source, in other embodiments, the seeds in the seed transport member 116 may alternatively be supplied positive air pressure from a different air pressure source to help hold the seeds in the seed cells 140.

Additionally, the seed meter 100 may include a singulator 160 as will be described in greater detail below. As is generally understood, the singulator 160 may be configured to singulate the seeds conveyed within the seed meter 100 via the seed transport member for individual release from the meter 100. Further, one or more sensors may be provided in operative association with the seed meter 100 for monitoring one or more operating parameters of the seed meter 100. For instance, as will be described in greater detail below, the seed meter 100 may include one or more seed pool sensors 102, pre-singulation sensors 104, post-singulation sensors 106, and/or post-delivery sensors 108 for monitoring one or more parameters associated with the operation of the seed meter 100. In addition, the seed meter 100 may also include or be provided in operative association with one or more additional sensors, such as a position sensor(s) (not shown in FIG. 2) for monitoring the rotation and/or rotational position of the seed transport member within the seed meter 100. Moreover, a seed delivery sensor 80 may be provided in operative association with the seed tube 72 (or other seed delivery mechanism) for monitoring the seeds falling or being transported through the seed tube 72 (or other seed delivery mechanism) after being discharged from the seed meter 100.

It should be appreciated that the configuration of the row unit 28 described above and shown in FIG. 2 is provided only to place the present subject matter in an exemplary field of use. Thus, it should be appreciated that the present subject matter may be readily adaptable to any manner of row unit configuration.

Figure 3:
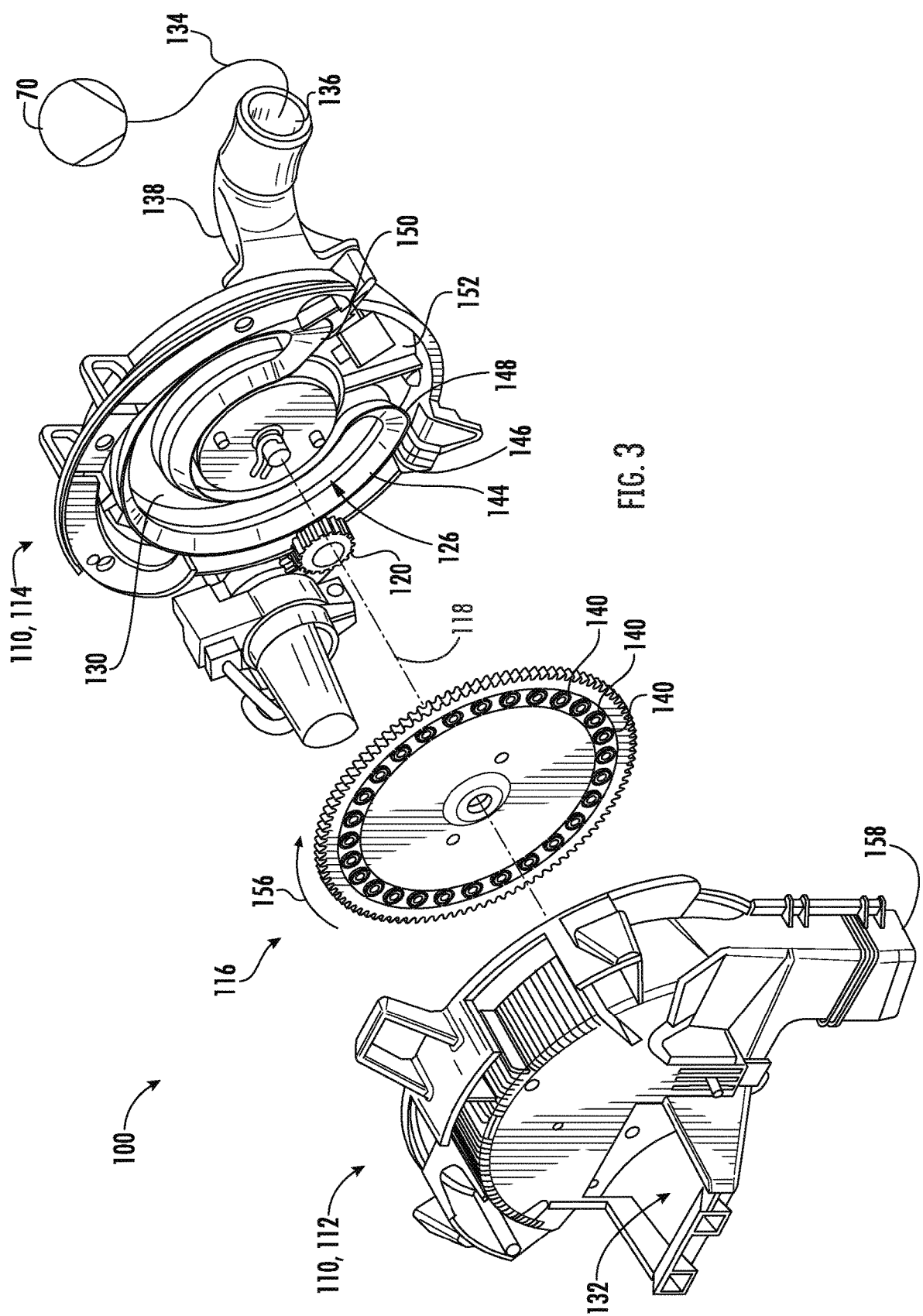
FIG. 3 illustrates a perspective, exploded view of one embodiment of a seed meter suitable for use within a row unit in accordance with aspects of the present subject matter.
Figure 4:
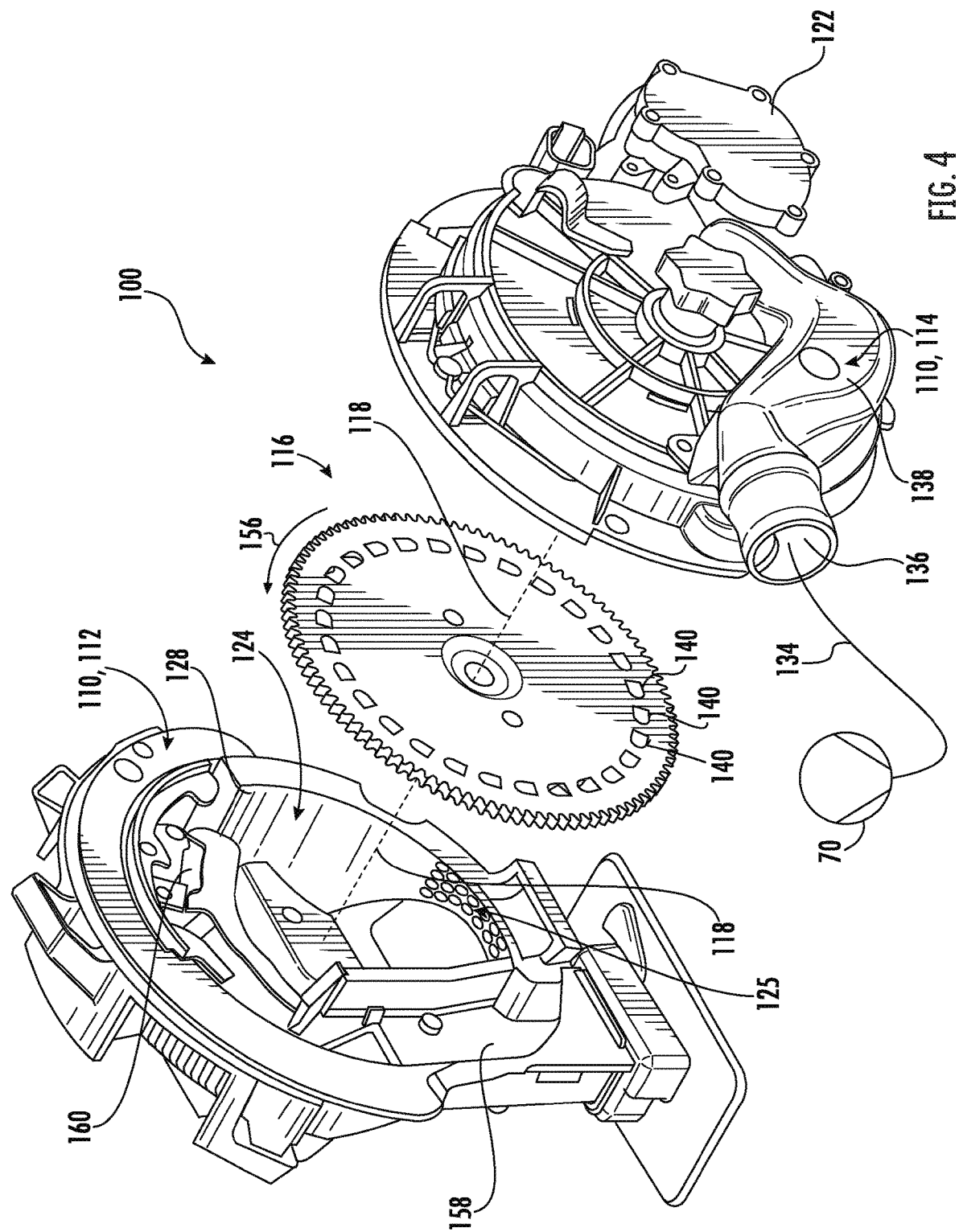
FIG. 4 illustrates another perspective, exploded view of the seed meter shown in FIG. 3.
Figure 5:
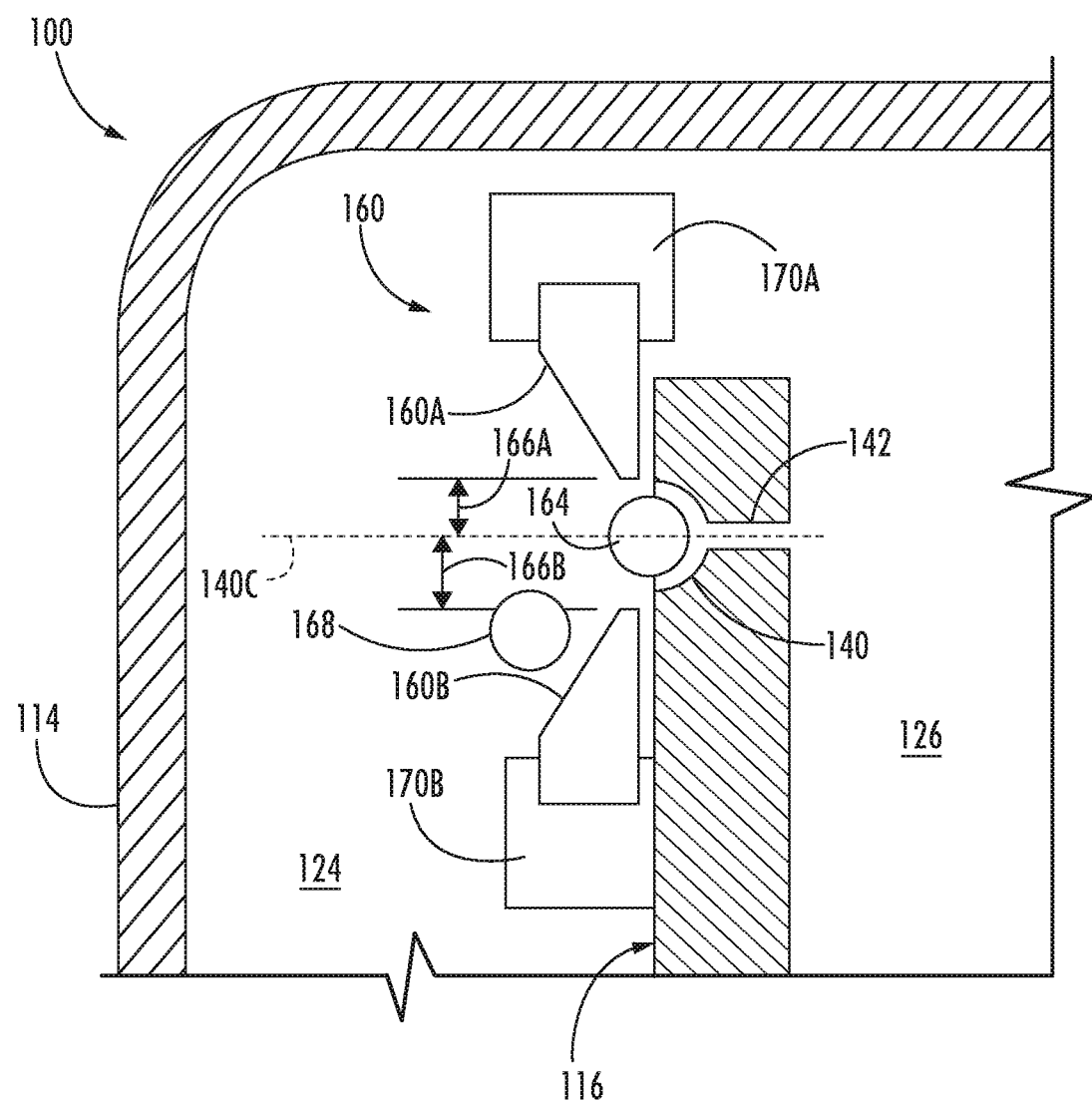
FIG. 5 illustrates one embodiment of a singulator suitable for use within the disclosed seed meter in accordance with aspects of the present subject matter, particularly illustrating the singulator positioned relative to an associated seed transport member of the seed meter.

Referring now to FIGS. 3-5, several views of one embodiment of a seed meter 100 are illustrated in accordance with aspects of the present subject matter. Specifically, FIGS. 3 and 4 illustrate perspective, exploded views of the seed meter 100. Additionally, FIG. 5 illustrates a cross-sectional view of a singulator of the seed meter during operation of the seed meter.

In general, the seed meter 100 may include an outer housing 110 configured to encase the various internal components of the meter 100. As shown in FIGS. 3 and 4, the housing 110 may, for example, correspond to a multi-piece assembly, such as by including a seed-side housing component 112 and a vacuum-side housing component 114 configured to be coupled to each other to form the housing 110. Additionally, the seed meter 100 includes a seed transport member 116 configured to be disposed between the housing components 112, 114 within the interior of the seed meter 100. As is generally understood, the seed transport member 116 is supported by the housing 110 about a central axis of rotation (indicated by line 118). Moreover, as shown in FIG. 4, in one embodiment, the outer edge of the seed transport member 116 may be configured to engage and be driven by a drive sprocket 120 that is rotatably driven in turn by a meter drive member 122, such as a motor, that can be operatively connected and controlled to effect rotation of the seed transport member 116 within the housing 110 about the central axis 118.

In one embodiment, both a seed chamber 124 (FIG. 4) and a vacuum chamber 126 (FIG. 3) may be defined within the interior of the seed meter 100 along opposed sides of the seed transport member 116. For instance, as shown in FIG. 4, the seed chamber 124 may be configured to be defined between one side of the seed transport member 116 and an associated seed chamber wall 128 of the seed-side housing component 112. As is generally understood, at least a portion of the seed chamber 124 may define a seed pool 125 (FIG. 4) within which seeds are retained within the seed meter 100 prior to being picked up by the seed transport member 116.

Similarly, as shown in FIG. 3, the vacuum chamber 126 may be configured to be defined between the opposed side of the seed transport member 116 and an associated vacuum chamber wall 130 of the vacuum-side housing component 114. In such an embodiment, by applying a vacuum or air pressure differential to the seed transport member 116 along the side of the seed transport member 116 opposite the seed chamber 124, the seeds contained within the seed chamber 124 may be attached to the seed transport member 116 and subsequently carried with rotation of the seed transport member 116 for discharge from the seed meter 100.

As shown schematically in FIGS. 3 and 4, the vacuum chamber 126 of the seed meter 100 may be connected to the associated vacuum source 70 via a suitable vacuum conduit 134. For instance, the vacuum conduit 134 may be coupled to a vacuum port 136 of a vacuum manifold 138 forming part of or otherwise provided in operative association with the vacuum-side housing component 114. As such, a negative pressure from the vacuum source 70 may be applied through the vacuum conduit 134 and associated vacuum manifold 138 to create a vacuum within the vacuum chamber 126 that causes the seeds within the seed chamber 124 to become attached to the opposed side of the seed transport member 116.

As further shown in FIGS. 3 and 4, a plurality of seed cells 140 may be defined around a perimeter region of the seed transport member 116. Specifically, the seed cells 140 may be spaced uniformly apart from each other in an annular array around the seed transport member 116 so that constant rotation of the seed transport member 116 results in a commensurately constant rate at which a seed cell 140 passes a given fixed point within the seed meter 100. As particularly shown in FIG. 5, each seed cell 140 includes an opening 142 defined through the seed transport member 116, thereby allowing the vacuum provided along the opposed side of the seed transport member 116 to be applied through the seed transport member 116 for picking-up a corresponding seed at a given location within the seed meter 100.

As particularly shown in FIG. 3, a sealing gasket 144 may be disposed between the vacuum channel wall 130 and the seed transport member 116 and may define a sealing edge 146 that seals against the adjacent side of the seed transport member 116 facing toward the vacuum channel wall 130 when the seed meter 100 is fully assembled. Thus, as shown in FIG. 3, the seed transport member 116, in combination with the vacuum channel wall 140 and the sealing gasket 144, may collectively define the vacuum chamber 126. Moreover, as shown in FIG. 3, the vacuum chamber 126 may be configured and confined to be coincident with the perimeter portion of the seed transport member 116 around which the seed cells 140 are defined. Accordingly, the vacuum chamber 126 may be sealed off from a post-delivery region, which generally extends within the seed meter from the location at which the seeds are designed to separate from the seed transport element 116 (e.g., following rotation past a distal end 150 of the vacuum chamber 126) and the location at which the seed cells 140 are reintroduced to the seed pool 125 within the seed chamber 124 of the seed meter 100 (e.g., following rotation past a proximal end 148 of the vacuum chamber 126).

As particularly shown in FIG. 5, the singulator 160 may be positioned within the seed chamber 124, opposite the seed transport member 116 from the vacuum chamber 126. The singulator 160 includes a pair of seed deflectors (e.g., upper and lower seed deflectors 160A, 160B) positioned relative to the seed cells 140 (one of which is shown) of the seed transport member 116. In general, the singulator 160 may be adjusted such that, as a seed cell 140 is conveyed past the seed deflectors 160A, 160B, a single seed 164 within the seed cell 140 passes through the upper and lower seed deflectors 160A, 160B of singulator 160 without being knocked off the seed transport member 116 by the deflector(s) 160A, 160B. Any further seed 168 within the seed cell 140 contacts one or both of the seed deflectors 160A, 160B such that the further seed(s) 168 is knocked off of the seed transport member 116.

It should be appreciated that, in some embodiments, the deflectors 160A, 160B may be staggered along the circumferential path of the seed cells 140 such that the seed cells 140 pass through the deflectors 160A, 160B sequentially to allow the seeds 168 contact at least one of the deflectors 160A, 160B. Alternatively, in other embodiments, the deflectors 160A, 160B may be positioned directly opposite each other across a seed cell 140 such that the seed cells 140 pass through the deflectors 160A, 160B substantially simultaneously while contacting at least one of the deflectors 160A, 160B.

The aggressiveness setting of the singulator 160 may be adjusted by changing one or both of the respective distances 166A, 166B defined between each deflector 160A, 160B and a centerline 140C of the seed cells 140. For example, in one embodiment, the distance 166A between the upper seed deflector 160A and the centerline 140C of the seed cells 140 is adjustable by actuating a first actuator 170A configured to actuate the upper seed deflector 160A and the distance 166B between the lower seed deflector 160B and the centerline 140C of the seed cells 140 is adjustable by actuating a second actuator 170B configured to actuate the lower seed deflector 160B. It should be appreciated that, in other embodiments, both deflectors 160A, 160B may instead be actuatable by a common actuator. The distances 166A, 166B between the deflectors 160A, 160B and the centerline 140C of the seed cells 140 may be different, such that one of the deflectors 160A, 160B is more aggressive than the other. However, in other embodiments, the distances 166A, 166B between the deflectors 160A, 160B and the centerline 140C of the seed cells 140 may be the same, such that the deflectors 160A, 160B are equally aggressive. By increasing the distance(s) 166A, 166B, the aggressiveness setting of the singulator 160 may be reduced or lowered such that the singulator 160 may knock fewer "multiples" (e.g., further seeds 168) off of the seed transport member 116 and/or allow larger seeds 164 to pass therethrough. Alternatively, by decreasing the distance(s) 166A, 166B the aggressiveness setting of the singulator 160 may be increased such that the singulator 160 may more effectively knock multiples off of the seed transport member 116 and/or may only allow smaller seeds 164 to pass therethrough.

As indicated above with reference to FIG. 2, the seed meter 100 may also include various sensors, such as seed pool sensor 102, a pre-singulation sensor 104, a post-singulation sensor 106, and a post-deliver sensor 108. In general, the seed pool sensor 102 (FIG. 2) may correspond to any suitable sensor or sensing device configured to monitor the presence or absence of seeds within one or more of the seed cells 140 passing through a seed acquisition region of the seed meter 100 at which seeds are initially staged or retained for subsequent pick-up by the seed transport member 116, e.g., at the seed pool 125 for the seed meter 100. As such, in several embodiments, the seed pool sensor 102 may have a detection zone that is directed towards the portion of the seed transport member 116 that passes through the relatively lowest region of the seed chamber 124 to detect the presence or absence of seeds at this lower portion of the seed acquisition region to provide an indication of the amount of seeds remaining within the seed pool 125. In one embodiment, the seed pool sensor 102 may correspond to an optical sensor.

Additionally, in several embodiments, the pre-singulation sensor 104 (FIG. 2) and the post-singulation sensor 106 (FIG. 2) may generally be configured to detect the presence or absence of seeds contained within the seed cells 140 being conveyed immediately upstream of the singulator 160 and immediately downstream of the singulator 160, respectively. For instance, in one embodiment, the pre-singulation sensor 104 may be positioned within the seed meter 100 such that its detection zone is aligned with a location within a pre-singulation region between the seed pool 125 and the singulator 160 while the post-singulation sensor 106 may be positioned within the seed meter 100 such that its detection zone is aligned with a location within a post-singulation region between the singulator 160 and the post-delivery region (or the distal end 150 of the vacuum chamber 126). In some instances, the sensors 104, 106 may further detect a number of seeds within the seed cells 140 passing through their respective detection zones. In some embodiments, each of the sensors 104, 106 may, for instance, correspond to an optical sensor.

Moreover, the post-delivery sensor 108 may generally have a detection zone that is directed towards the portion of the seed transport member 116 that passes through the post-delivery region of the seed meter 100. In such embodiments, given the absence of a vacuum being applied to the seed transport member 116 within the post-delivery region, the post-delivery sensor 108 may generally be configured to detect the empty seed cells 140 passing by the location of the sensor 108 following the release of the seeds contained therein (e.g., following rotation past the distal end 150 of the vacuum chamber 126) but prior to such seed cells 140 being reintroduced back into the seed pool within the seed chamber 124 of the seed meter 100. In addition, the post-delivery sensor 108 may also be used to detect a seed that is stuck or that otherwise remains within its corresponding seed cell 140 as the seed cell 140 as rotated through the post-delivery region. In some embodiments, the post-delivery sensor 108 may correspond to an optical sensor.

It should be appreciated that the configuration of the seed meter 100 described above and shown in FIGS. 3-5 is provided only to place the present subject matter in an exemplary field of use. Thus, it should be appreciated that the present subject matter may be readily adaptable to any manner of seed meter configuration.

Figure 6:
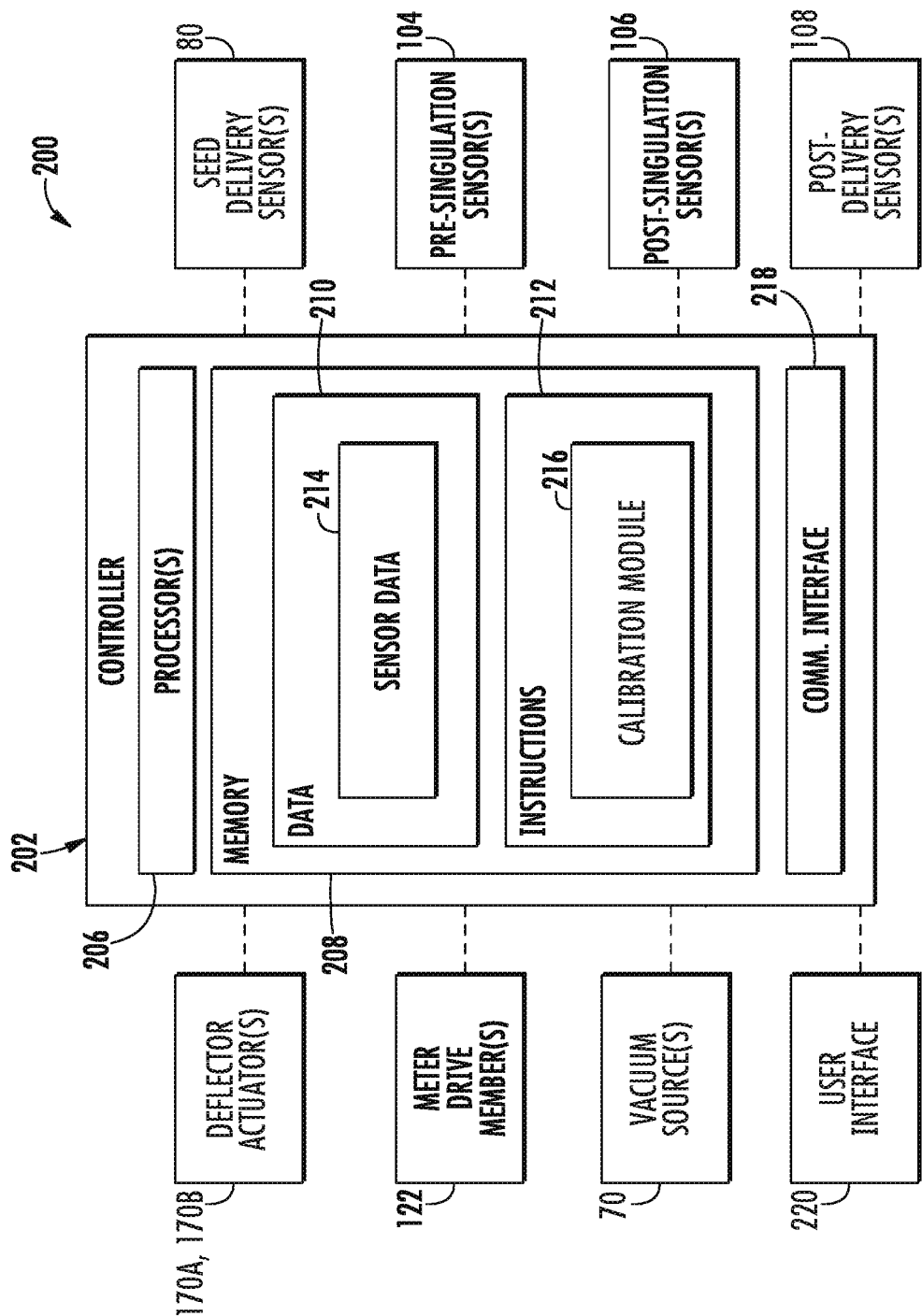
FIG. 6 illustrates a schematic view of one embodiment of a system for calibrating a seed meter in accordance with aspects of the present subject matter.

Referring now to FIG. 6, a schematic view of one embodiment of a system 200 for calibrating the operation of a seed meter is illustrated in accordance with aspects of the present subject matter. In general, the system 200 will be described herein with reference to the planting implement 20, the row unit 28, and the seed meter 100 described above with reference to FIGS. 1-5. However, it should be appreciated that the disclosed system 200 may generally be utilized with any planter or seeder having any suitable implement configuration, with row units having any suitable row unit configuration, with seed meters having any suitable meter configuration and/or with seed transport members have any suitable transport member configuration.

In several embodiments, the system 200 may include a controller 202 and various other components configured to be communicatively coupled to and/or controlled by the controller 202, such as a meter drive member 122 configured to rotationally drive the seed meter 100, a vacuum source 70 configured to configured to generate a vacuum pressure that attaches the seeds to a rotating seed transport member, one or more deflector actuators 170A, 170B configured to adjust an aggressiveness of a singulator 160, and/or various sensors configured to monitor one or more operating parameters associated with the seed meter 100. For example, the controller 202 may be communicatively coupled to one or more sensors (e.g., the pre-singulation sensor 104, the post-singulation sensor 106, and/or the seed delivery sensor 80) that are configured to provide sensor data indicative of the number of seed skips occurring as during operation of the seed meter 100, and one or more sensors configured to provide data indicative of the number of occurrences of multiples released from the seed meter 100 (e.g., the seed delivery sensor 80). As will be described below, by analyzing the sensor data, the controller 202 may be configured to determine desired operating ranges of various components of the seed meter 100.

It should further be appreciated that the controller 202 may correspond to any suitable processor-based device(s), such as a computing device or any combination of computing devices. Thus, as shown in FIG. 6, the controller 202 may generally include one or more processor(s) 206 and associated memory devices 208 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 208 may generally be configured to store information accessible to the processor(s) 206, including data 210 that can be retrieved, manipulated, created and/or stored by the processor(s) 206 and instructions 212 that can be executed by the processor(s) 206.

In several embodiments, the data 210 may be stored in one or more databases. For example, the memory 208 may include a sensor database 214 for storing sensor data, such as data associated with the operation of the seed meter 100 as received from the various sensors. For instance, during operation of the seed meter 100, data from all or a portion of the sensors communicatively coupled to the controller 202 may be stored (e.g., temporarily) within the sensor database 214 and subsequently used to determine one or more parameter values associated with the operation of the seed meter 100 (e.g., the presence or absence of seeds within the various seed cells 140, the number of seed skips occurring across a given time period or number of revolutions of the seed transport member 116, the number of seed multiples occurring across a given time period or number of revolutions of the seed transport member 116, and/or the like).

Additionally, in several embodiments, the instructions 212 stored within the memory 208 of the controller 202 may be executed by the processor(s) 206 to implement a calibration module 216. In general, the calibration module 216 may be configured to sample and/or evaluate the data received from the various sensors communicatively coupled to the controller 202. In one embodiment, the calibration module 216 may be configured to sample and/or evaluate the data from one or more of the sensors described herein continuously, periodically, or only as demanded.

Moreover, as shown in FIG. 6, the controller 202 may also include a communications interface 218 to provide a means for the controller 202 to communicate with any of the various other system components described herein. For instance, one or more communicative links or interfaces (e.g., one or more data buses) may be provided between the communications interface 218 and both the vacuum source 70 and the deflector actuator(s) 170A, 170B to allow the controller 202 to transmit control signals for automatically controlling the operation of such components. Similarly, one or more communicative links or interfaces (e.g., one or more data buses) may be provided between the communications interface 218 and the various sensors to allow the associated sensor data to be transmitted to the controller 202.

Furthermore, in some embodiments, the system 200 may also include a user interface 220 in communication with the controller 202. More specifically, the user interface 220 may be configured to provide feedback (e.g., notifications associated with the operational parameters of the seed meter 100 and/or vacuum source 70) to the operator of the implement 10. As such, the user interface 220 may include one or more feedback devices (not shown), such as display screens, speakers, warning lights, and/or the like, which are configured to communicate such feedback. In addition, some embodiments of the user interface 220 may include one or more input devices (not shown), such as touchscreens, keypads, touchpads, knobs, buttons, sliders, switches, mice, microphones, and/or the like, which are configured to receive user inputs from the operator. In one embodiment, the user interface 220 may be positioned within a cab of a work vehicle configured to tow the implement 10 across the field. However, in alternative embodiments, the user interface 220 may have any suitable configuration and/or be positioned in any other suitable location.

It should be appreciated that, in general, the controller 202 of the disclosed system 200 may correspond to any suitable computing device(s) that is configured to function as described herein. In several embodiments, the controller 202 may form part of an active planting system configured to perform a planting operation, such as by corresponding to a vehicle controller of a work vehicle configured to tow an associated planter 20 and/or an associated implement controller of the planter 20. Alternatively, the controller 202 may comprise a separate computing device(s) configured to be used primarily for the purpose of performing the various calibration methods and/or routines described herein.

It should additionally be appreciated that the controller 202 may correspond to an existing controller of the implement 10 or an associated work vehicle (not shown) or the controller 202 may correspond to a separate processing device. For instance, in one embodiment, the controller 202 may form all or part of a separate plug-in module that may be installed within the implement 10 or associated work vehicle to allow for the disclosed system and method to be implemented without requiring additional software to be uploaded onto existing control devices of the implement 10 or the associated work vehicle.

Several routines and methods will be described below that may be used to automatically calibrate the seed meter 100. More particularly, the routines and methods may be used to determine appropriate vacuum pressure settings and/or range ranges and/or appropriate singulator aggressiveness settings and/or ranges for a seed meter and a given seed type. Generally, depending on the size and shape, a seed type may be more sensitive to changes in vacuum pressure or to changes in singulator aggressiveness. For example, if a seed shape is flat, rounded with a point, or is small, less vacuum pressure may be required to pick up seeds, but seed multiples may be more likely, thus singulation is needed. If a seed type is large, higher vacuum pressure is required to pick up seeds, but seed multiples are less likely, thus singulation is less necessary. As such, it is important that the vacuum pressure and singulator aggressiveness be calibrated properly for an individual seed meter and seed type.

It should be appreciated that the various calibration methods and routines disclosed herein will generally be described as corresponding to static calibration processes such that each calibration method and/or routine is performed while the implement 10, row unit 28, and/or seed meter 100 is stationary (i.e., not moving across a field to actively plant seeds within the ground). However, one of ordinary skill in the art will appreciate that various aspects of the disclosed methods and/or routines may be also be applied as part of a dynamic calibration process performed during the execution of a planting operation.

Figure 7:
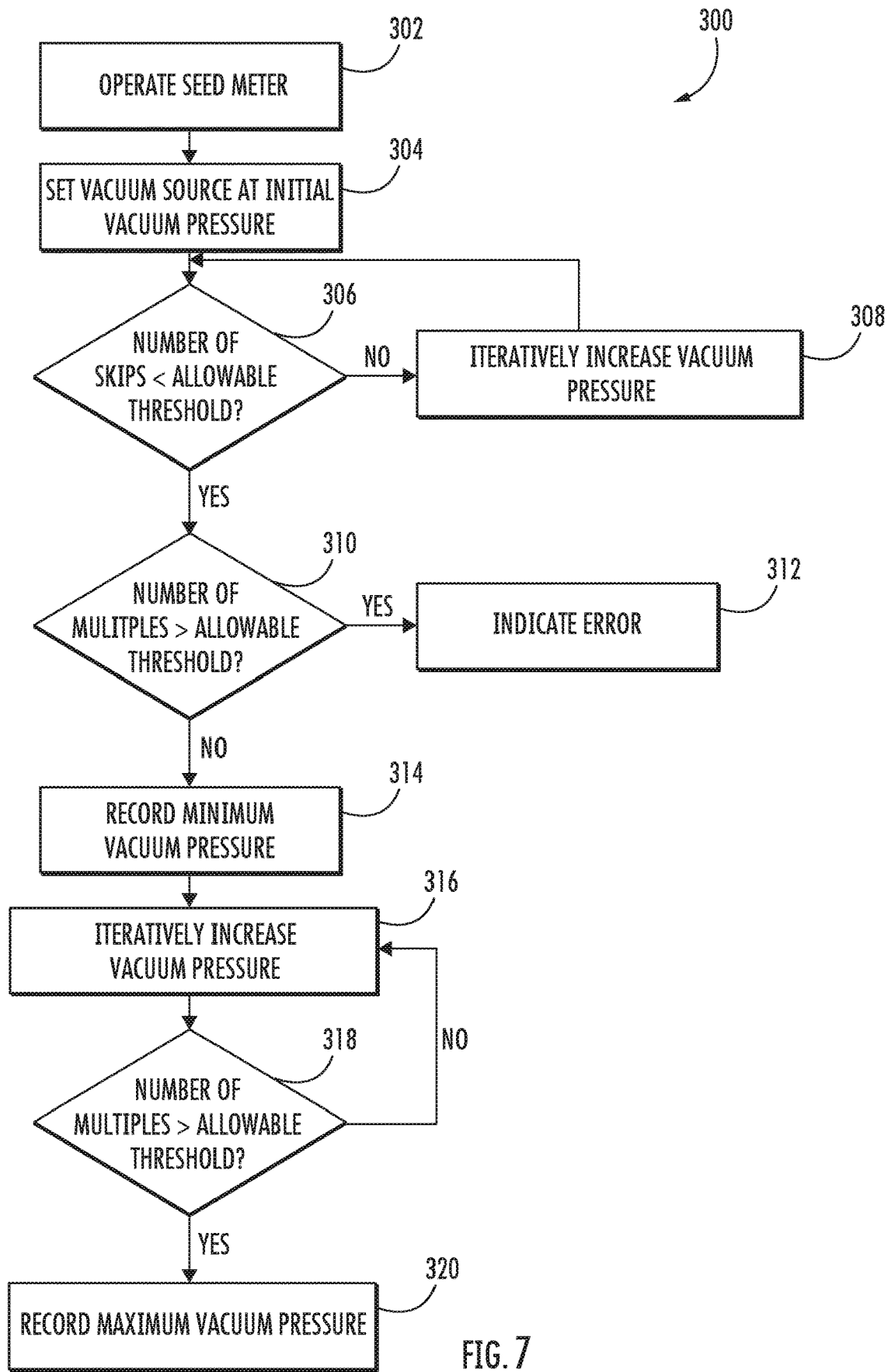
FIG. 7 illustrates a flow diagram of one embodiment of a control routine that may be executed when calibrating a vacuum source of a seed meter in accordance with aspects of the present subject matter.

Referring now to FIG. 7, a flow diagram of one embodiment of a control algorithm or routine 300 that may be executed when automatically calibrating a vacuum source for a seed meter is illustrated in accordance with aspects of the present subject matter. In general, the control routine 300 will be described herein as being implemented by the controller 202 of the system 200 described above with reference to FIG. 6. However, it should be appreciated that the various processes described below may alternatively be implemented by another computing device or any combination of computing devices. In addition, although FIG. 7 depicts control steps or functions performed in a particular order for purposes of illustration, the control routines discussed herein are not limited to any particular order or arrangement. One skilled in the art, using the disclosures provided herein, will appreciate that the various steps or functions of the algorithms disclosed herein can be omitted, rearranged, combined, and/or adapted in various ways without deviating from the scope of the present disclosure.

As shown in FIG. 7, while the implement 10, row unit 18, and/or seed meter 100 is in a static position or is otherwise stationary, at (302), the controller 202 may be configured to control the meter drive member 122 of the seed meter 100 as described above to rotate the seed transport member 116 within the meter housing 110 relative to the seeds contained within the seed pool 125. Additionally, the controller 202 may control the vacuum source 70, at (304), to set the vacuum pressure of the vacuum source 70 at an initial vacuum pressure. In some embodiments, such as the embodiment described in FIG. 7, the initial vacuum pressure of the vacuum source 70 may correspond to a minimum vacuum setting for the vacuum source 70. For instance, in some embodiments, the vacuum pressure at the minimum vacuum setting may be approximately equal to zero (e.g., slightly greater than zero) such that there is at least some vacuum pressure applied to the seed transport member 116 when the vacuum source 70 is at its minimum vacuum setting. By using the lowest vacuum pressure possible during the calibration cycle, less energy is used and less wear is caused on associated parts. Alternatively, as will be described below, in other embodiments, the initial vacuum pressure may correspond to a maximum vacuum setting for the vacuum source 70. In some embodiments, the initial vacuum pressure may be predetermined and stored in the memory 208 of the controller 202. However, it should be appreciated that the initial vacuum pressure may otherwise be selected.

Thereafter, the controller 202 may be configured to determine a minimum acceptable vacuum pressure of the vacuum source 70 at which the seed meter 100 operation satisfies a given operational threshold(s) associated with the number of seeds being released from the meter 100. For example, as shown in FIG. 7, at (306), the controller 202 may be configured to assess whether the vacuum pressure is high enough to allow the seed transport member 116 to adequately pick-up seeds and transport such seeds to the release point for subsequent delivery to the seed tube 82. More particularly, the controller 202 may be configured to determine whether the number of seed skips detected by one of the sensors, e.g., by the pre-singulation sensor 104, the post-singulation sensor 106, and/or a seed delivery sensor 80, is less than or falls below a predetermined allowable skips threshold. For instance, when monitoring the seed meter operation via one of the internal seed meter sensors (e.g., the pre-singulation sensor 104 or the post-singulation sensor 106), the number of seed skips may be represented by the number of empty seed cells detected by such sensor(s). Similarly, when monitoring the seed meter operation via the seed delivery sensor 80, the number of seed skips may be represented by the number of actual skips detected by such sensor within the seed tube 82.

It should be appreciated that, in some embodiments, the predetermined allowable skips threshold may be, for example, an input provided by the operator via the user interface 220. However, in other embodiments, the predetermined allowable skips threshold may be found or selected in any other suitable way, such as from a predetermined look-up table stored in the controller 202, for example. In general, the predetermined skips threshold may correspond to a number of allowable skips per given number of seeds or number of revolutions of the seed transport member 116 (or for a given amount of operating time). For example, the predetermined skips threshold may accept 10 skips per 1000 seeds, 5 skips per 1000 seeds, or 1 skip per 1000 seeds. It should be appreciated that, in one embodiment, the post-delivery sensor(s) 108 may be used to determine whether skips detected, for example, by the seed delivery sensor 80 are caused by the vacuum pressure being too low or by seeds stuck in the seed cells 140.

In the event that the number of skips is greater than the predetermined allowable skips threshold, the controller 202 may be configured to determine that the vacuum pressure of the vacuum source 70 is not high enough. Thus, at (308), the controller 202 may control the vacuum source 70 to iteratively increase the vacuum pressure. It should be understood that a vacuum source 70 may be operated to provide a range of vacuum pressures. The range of vacuum pressures may be divided by discrete intervals, of equal or varying size, into several vacuum pressure steps or settings. An iterative increase is therefore intended to mean increasing the vacuum pressure of the vacuum source 70 from a lower vacuum pressure setting corresponding to a lower vacuum pressure by a given interval to a higher vacuum pressure setting corresponding to a higher vacuum pressure. As such, several vacuum pressures may be tested during calibration of the seed meter 100. In some embodiments, the vacuum pressure may be increased between directly adjacent or consecutive iterative pressure settings for the vacuum source 70. Alternatively, in some embodiments, the vacuum pressure may be increased by several vacuum pressure settings at a time.

Following each iterative increase of the vacuum pressure, the controller 202 may wait until a predetermined delay period lapses before re-checking (e.g., at 306) whether the number of skips at the increased vacuum pressure of the vacuum source is less than the predetermined allowable skips threshold. In such instance, once the predetermined delay period has lapsed, the controller 202 may continue to operate the seed meter for a given duration (e.g., for a given number of seeds, number of rotations of the seed transport member 116, or predetermined time period associated with the predetermined allowable skips threshold) to allow the number of skips to be re-assessed relative to the threshold. It should be appreciated that the predetermined delay period may, for example, be chosen such that the seed meter 100 reaches a steady state condition after the increase in vacuum pressure. In some embodiments, the delay period may correspond to a predetermined amount of time, e.g., such as 30 seconds, 1 minute, etc. In other embodiments, however, the delay period may correspond to dispensing of a predetermined number of seeds, e.g., 50 seeds, 100 seeds, 200 seeds, etc. In such embodiment, one or more of the sensors 104, 106, 108 within the seed meter 100 and/or the seed delivery sensor(s) 80 may be used to accurately count the number of dispensed seeds.

Once it is detected that the number of skips is less than or has fallen below the predetermined allowable skips threshold at (306), the controller 202 may, at (310), be configured to determine whether the current vacuum pressure of the vacuum source 70 at which the seed meter 100 operates satisfies a given operational threshold(s) associated with the number of seeds being released from the meter 100. For example, as shown in FIG. 7, at (310), the controller 202 may be configured to assess whether the number of occurrences of seed multiples detected by one of the sensors, e.g., the seed delivery sensor 80, is greater than or exceeds a predetermined allowable multiples threshold. It should be appreciated that, in some embodiments, the number of skips and the number of occurrences of seed multiples may be detected by the same sensor, e.g., the seed delivery sensor 80, or may be detected by separate sensors.

Similar to the predetermined allowable skips threshold, it should be appreciated that, in some embodiments, the predetermined allowable multiples threshold may, for example, be an input provided by the operator via the user interface 220. However, in other embodiments, the predetermined allowable multiples threshold may be found or selected in any other suitable way, such as from a predetermined look-up table stored in the controller 202. In general, the predetermined allowable multiples threshold may allow or accept a number of occurrences of seed multiples (hereinafter referred to as "number of multiples") per given number of seeds (or per a given amount of operating time) or compared to a number of rotations of the seed transport member 116. For example, the operator may allow 10 seed multiples per 1000 seeds, 5 seed multiples per 1000 seeds, or 1 seed multiples per 1000 seeds.

In the event that the number of multiples is greater than the predetermined allowable multiples threshold at the current vacuum pressure, the controller 202 may determine that the seed meter 100 cannot operate as desired and, at (312), indicate an error. More particularly, if the number of skips at the current vacuum pressure is within the allowable skips threshold, but the number of multiples at the current vacuum pressure exceeds the allowable multiples threshold, there is no range of vacuum that can suitably meter the current seed type or seed lot being metered within the seed meter 100 alone. Instead, the vacuum source 70 needs to be used in conjunction with the singulator 160 for that particular seed type or seed lot.

Otherwise, in the event that the number of multiples is less than the predetermined allowable multiples threshold, the controller 202 may, at (314), be configured to record the current vacuum pressure of the vacuum source 70 as the minimum acceptable vacuum pressure for the seed meter 100. In this regard, the minimum acceptable vacuum pressure may, for instance, correspond to the minimum vacuum pressure for the seed meter and the associated seed type at which the seed meter can be operated while maintaining the number of skips below the allowable threshold. As indicated above, the "initial vacuum pressure" set at (304) may correspond, for example, to the lowest vacuum pressure setting for the vacuum source 70. In such instance, it would typically be expected that the number of skips at such setting would exceed the allowable skips threshold. Thus, by iteratively increasing the vacuum pressure and re-assessing the performance of the seed meter at each iterative setting, the controller 202 may determine the minimum pressure setting at which the operation of the seed meter 100 is acceptable in terms of the number of seed skips.

Moreover, in addition to determining the minimum acceptable vacuum pressure for the vacuum source 70, the controller 202 may also be configured to determine a maximum acceptable vacuum pressure of the vacuum source 70 at which the seed meter operation satisfies a given operational threshold(s) associated with the number of seeds being released from the meter 100. For example, as shown in FIG. 7, with the vacuum source 70 initially operating at the minimum vacuum pressure recorded at (314), the controller 202 may, at (316), be configured to iteratively increase the vacuum pressure and thereafter, at (318), be configured to determine whether the number of occurrences of seed multiples detected by one of the sensors at the iteratively increased vacuum pressure is greater than or exceeds the predetermined allowable multiples threshold.

In the event that the number of multiples is less than the predetermined allowable multiples threshold, the controller 202 may determine that the vacuum pressure may be further increased at (316), control the vacuum source 70 to iteratively increase the vacuum pressure. Thereafter, the controller 202 may wait a predetermined delay period before re-checking (at 312) whether the number of multiples at the increased vacuum pressure of the vacuum source 70 is greater than the predetermined allowable multiples threshold. For instance, the predetermined delay period may be chosen based on the amount of seeds, number of revolutions of the seed transport member 116, or operating time required for the seed meter 100 to reach steady state operation. In such instance, once the predetermined delay period has lapsed for a new vacuum setting, the controller 202 may continue to operate the seed meter for a given duration (e.g., for a given number of seeds or predetermined time period associated with the predetermined allowable multiples threshold) to allow the number of multiples to be re-assessed relative to the threshold.

Once it is detected that the number of multiples is greater than or exceeds the predetermined allowable multiples threshold at (318), the controller 202 may, at (320), be configured to record the previous vacuum pressure of the vacuum source 70 (i.e., the last vacuum pressure setting applied before the allowable multiples threshold was exceeded) as the maximum acceptable vacuum pressure for the seed meter 100. In this regard, the maximum acceptable vacuum pressure may, for instance, correspond to the maximum vacuum pressure for the seed meter and the associated seed type at which the seed meter can be operated while maintaining the number of multiples below the allowable threshold. Thus, by iteratively increasing the vacuum pressure and re-assessing the performance of the seed meter at each higher iterative setting, the controller 202 may determine the maximum pressure setting at which the operation of the seed meter 100 is acceptable in terms of the number of seed multiples.

It should be appreciated that the controller 202 may be configured to perform one or more additional vacuum calibration cycles to adjust or verify the minimum vacuum pressure and/or the maximum vacuum pressure determined during the initial vacuum calibration cycle (e.g., the routine 300). For example, in some embodiments, the minimum vacuum pressures determined during the initial vacuum calibration cycle and any additional, follow-up vacuum calibration cycles may be averaged to calculate a final average minimum acceptable vacuum pressure. Similarly, the maximum vacuum pressures determined during the initial vacuum calibration cycle and any additional, follow-up vacuum calibration cycles may be averaged to calculate a final average maximum acceptable vacuum pressure. However, the minimum and maximum vacuum pressures from the various vacuum calibration cycles may be otherwise analyzed or compared to determine final minimum and maximum vacuum pressures for the seed meter 100.

In addition to performing one or more additional vacuum calibration cycles following the initial vacuum calibration cycle (or as an alternative thereto), the controller 202 may be configured to perform a reverse air pressure calibration cycle, e.g., a reverse vacuum calibration cycle, in which the steps of the calibration routine 300 are reversed to better account for hysteresis effects. For example, in the case of a reverse vacuum calibration cycle following the determination of the maximum acceptable vacuum pressure (e.g., at 320), the controller 202 may increase the vacuum pressure by a given margin (e.g., 10% over the previously determined maximum acceptable vacuum pressure) and then iteratively decrease the vacuum pressure of the vacuum source 70 until it is detected that the number of multiples is less than the predetermined allowable multiples threshold, at which point the controller 202 may record the current vacuum pressure of the vacuum source 70 as a second maximum acceptable vacuum pressure. Thereafter, the controller 202 may further iteratively decrease the vacuum pressure of the vacuum source 70 until the number of skips is greater than the predetermined allowable skips threshold and record the previous vacuum pressure of the vacuum source 70 (e.g., the vacuum pressure before the allowable skips threshold was exceeded) as a second minimum acceptable vacuum pressure. By performing such a reverse calibration cycle, the controller 202 may further refine the specific pressure settings associated with the minimum and maximum acceptable vacuum pressures for the seed meter 100.

Alternatively, in the case of a stand-alone reverse calibration cycle, instead of the initial vacuum pressure corresponding to a minimum vacuum setting, the initial vacuum setting may instead correspond to a maximum vacuum setting for the vacuum source 70. As such, the controller 202 may be configured to iteratively decrease the vacuum pressure of the vacuum source 70 from the maximum vacuum setting, similar as described above, until it is detected that the number of multiples is less than the predetermined allowable multiples threshold, at which point the controller 202 may record the current vacuum pressure of the vacuum source 70 as a maximum acceptable vacuum pressure. Thereafter, the controller 202 may further iteratively decrease the vacuum pressure of the vacuum source 70 until the number of skips is greater than the predetermined allowable skips threshold and record the previous vacuum pressure of the vacuum source 70 (e.g., the vacuum pressure before the allowable skips threshold was exceeded) as a minimum acceptable vacuum pressure.

As a result of the above-described calibration routine 300, the controller 202 may define a target range of vacuum pressures, from the minimum acceptable vacuum pressure to the maximum acceptable vacuum pressure, in which the number of skips and multiples are within expectations. An appropriate operating vacuum pressure may then be selected from the target vacuum pressure range. For instance, in one embodiment, it may be desirable to select a vacuum pressure setting at or near the minimum value for the target range such that the lowest amount of energy required to operate the vacuum source 70 is used, thereby increasing the operating efficiency of the seed meter 100 and increasing the overall life of the seed meter 100 and/or vacuum source 70.

Figure 8:
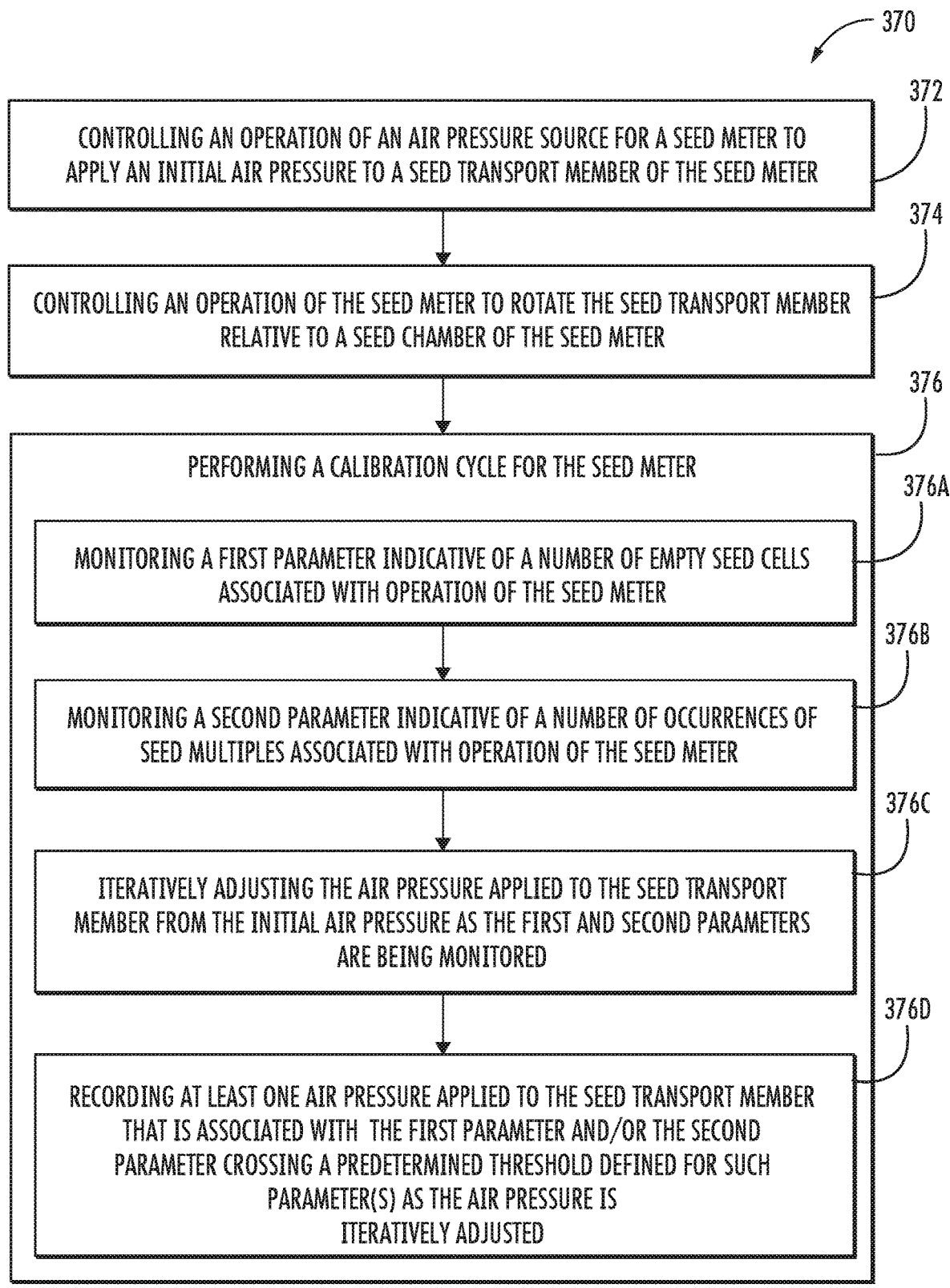
FIG. 8 illustrates a flow diagram of one embodiment of a method for calibrating a vacuum source of a seed meter in accordance with aspects of the present subject matter.

Referring now to FIG. 8, a flow diagram of one embodiment of a method 370 for automatically calibrating an air pressure source of a seed meter is illustrated in accordance with aspects of the present subject matter. In general, the method 370 will be described herein with reference to the system 200 described above with reference to FIG. 6. However, it should be appreciated by those of ordinary skill in the art that the disclosed method 370 may be implemented within any other system. In addition, although FIG. 8 depicts steps performed in a particular order for purposes of illustration and discussion, the method discussed herein are not limited to any particular order or arrangement. One skilled in the art, using the disclosures provided herein, will appreciate that various steps of the method disclosed herein can be omitted, rearranged, combined, and/or adapted in various ways without deviating from the scope of the present disclosure.

As shown in FIG. 8, at (372), the method 370 includes controlling an operation of an air pressure source for a seed meter to apply an initial air pressure to a seed transport member of the seed meter. For example, as indicated above, the vacuum source 70 may be controlled by the controller 202 to apply an initial vacuum pressure to the seed cells 140 of the seed transport member 116 of the seed meter 100.

Moreover, at (374), the method 370 includes controlling an operation of the seed meter to rotate the seed transport member relative to a seed chamber of the seed meter. For example, as indicated above, the controller 202 may control the operation of the meter drive member 122 to rotate the seed transport member 116 to pick up seeds from the seed chamber 124 of the seed meter 100.

Further, at (376), the method 370 includes performing a calibration cycle for the seed meter. For instance, as indicated above, the calibration cycle may be used to determine at least one of a minimum acceptable vacuum pressure or a maximum acceptable vacuum pressure to be applied by the vacuum source 70 to the seed meter 100.

As shown in FIG. 8, as part of the calibration cycle, the method 370 may include monitoring a first parameter indicative of a number of empty seed cells at (376A). For example, as described above, the controller 202 may receive sensor data from one or more of the sensors 80, 104, 106 indicating a number of seed skips occurring during operation of the seed meter 100 at a given vacuum pressure.

Additionally, as part of the calibration cycle, the method 370 may include monitoring a second parameter indicative of a number of occurrences of seed multiples associated with operation of the seed meter at (376B). For example, as described above, the controller 202 may receive sensor data from one or more of the sensors, e.g., the seed delivery sensor 80, indicating a number of multiples occurring during operation of the seed meter 100 at a given vacuum pressure.

Further, as part of the calibration cycle, the method 370 includes, at (376C), iteratively adjusting the air pressure from the initial air pressure as the first and second parameters are being monitored. As described above, the controller 202 may, for example, control the vacuum source 70 to iteratively increase the vacuum pressure from a lower vacuum pressure setting to a higher vacuum pressure setting while monitoring the number of skips and multiples detected by the sensor(s) 80, 104, 106.

Additionally, as part of the calibration cycle, the method 370 includes, at (376D), recording at least one air pressure applied to the seed transport member that is associated with the first parameter and/or the second parameter crossing a predetermined threshold defined for such parameter(s) as the vacuum pressure is iteratively adjusted. For example, as indicated above with reference to FIG. 7, the controller 202 may record a minimum acceptable vacuum pressure associated with the number of skips falling below an allowable skips threshold and/or a maximum acceptable vacuum pressure associated with the number of multiples exceeding an allowable multiples threshold.

Figure 9:
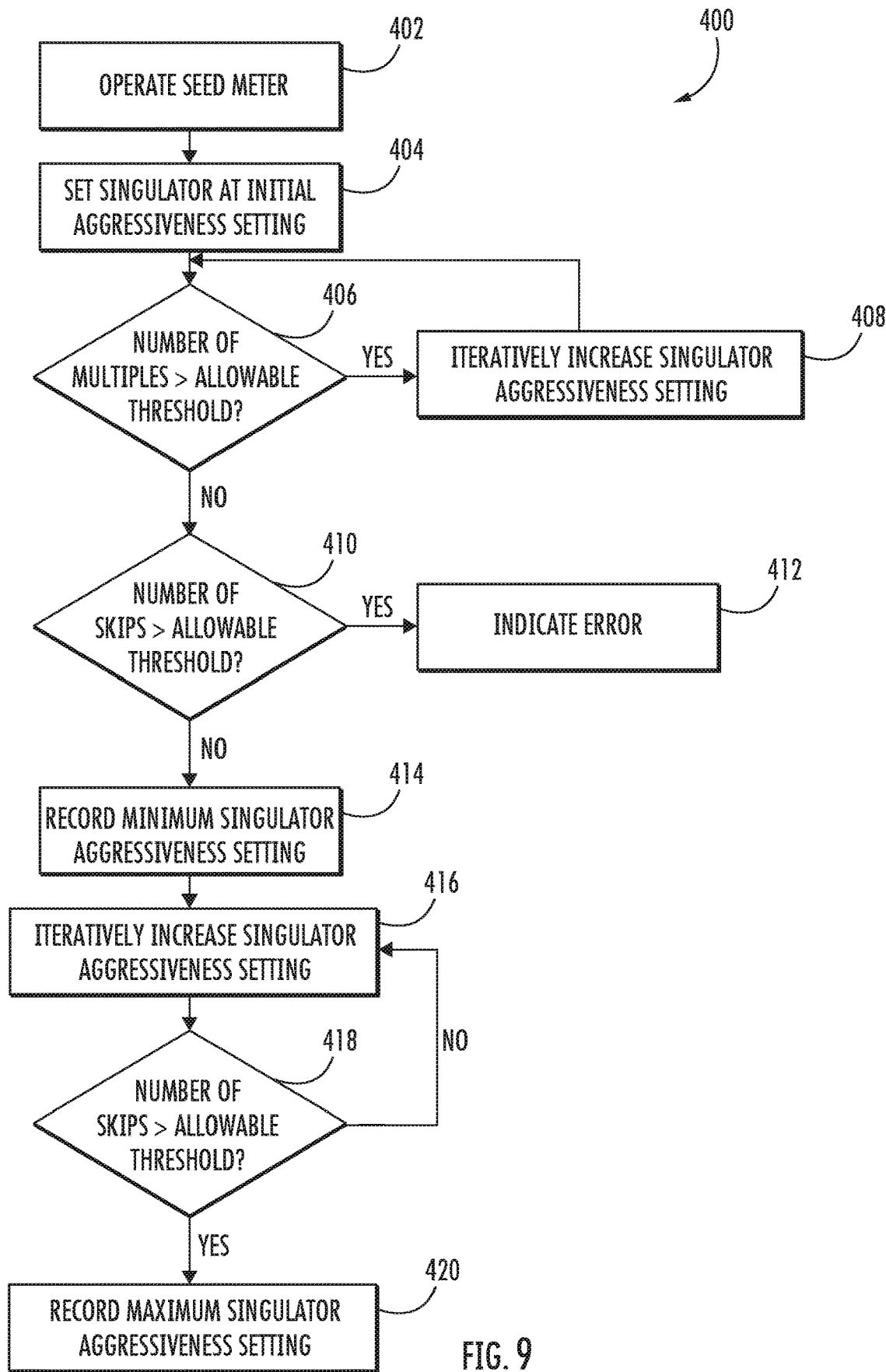
FIG. 9 illustrates a flow diagram of one embodiment of a control routine for calibrating a singulator of a seed meter in accordance with aspects of the present subject matter.

Referring now to FIG. 9, a flow diagram of one embodiment of a control algorithm or routine 400 that may be executed when automatically calibrating a singulator of a seed meter is illustrated in accordance with aspects of the present subject matter. In general, the control routine 400 will be described herein as being implemented by the controller 202 of the system 200 described above with reference to FIG. 6. However, it should be appreciated that the various processes described below may alternatively be implemented by another computing device or any combination of computing devices. In addition, although FIG. 9 depicts control steps or functions performed in a particular order for purposes of illustration, the control routines discussed herein are not limited to any particular order or arrangement. One skilled in the art, using the disclosures provided herein, will appreciate that the various steps or functions of the algorithms disclosed herein can be omitted, rearranged, combined, and/or adapted in various ways without deviating from the scope of the present disclosure.

As shown in FIG. 9, while the implement 10, row unit 18, and/or seed meter 100 is in a static position or otherwise stationary, at (402), the controller 202 may be configured to control the meter drive member 122 as described above to rotate the seed transport member 116 within the meter housing 110 relative to the seeds contained within the seed pool 125. Additionally, the controller 202 may further control the deflector actuator(s) 170A, 170B, at (404), to set the aggressiveness setting of the singulator 160 at an initial aggressiveness setting. In some embodiments, the initial aggressiveness setting for the singulator 160 may correspond to an aggressiveness setting within a passive range of settings of the singulator 160. Within the passive range of settings of the singulator 160, seeds being carried by the seed transport member 116 may have little to no contact with one or both of the deflectors 160A, 160B. For example, in some embodiments, the initial aggressiveness setting for the singulator 160 may be at its widest setting (e.g., at the largest distances 166A, 166B (FIG. 5)). Alternatively, in other embodiments, as will be described below, the initial aggressiveness setting may instead correspond to an aggressiveness setting within an aggressive range of aggressiveness settings of the singulator 160, where the distances 166A, 166B are configured such that seeds being carried by the seed transport member 116 may contact at least one of the deflectors 160A, 160B such that at least most, but preferably all, of the seed multiples 168 are knocked off of or out of the seed transport member 116 and some of the singulated seeds 164 are also knocked off of the seed transport member 116. In some embodiments, the initial aggressiveness setting may be predetermined and stored in the memory 208 of the controller 202. However, it should be appreciated that the initial aggressiveness setting may otherwise be selected.

Thereafter, the controller 202 may be configured to determine a minimum acceptable aggressiveness setting of the singulator 160 at which the seed meter operation satisfies a given operational threshold(s) associated with the number of seeds being released from the meter 100. For example, as shown in FIG. 9, at (406), the controller 202 may be configured to assess whether the aggressiveness setting is aggressive enough to allow a given number seed multiples to be eliminated by the singulator 160. More particularly, the controller 202 may be configured to determine whether the number of multiples detected by one of the sensor(s) downstream of the singulator 160, e.g., the seed delivery sensor 80, is less than or falls below a predetermined allowable multiples threshold, as described above.

In the event that the number of multiples is greater than the predetermined allowable multiples threshold, the controller 202 may be configured to determine that the aggressiveness setting of the singulator 160 is not aggressive enough and, at (408), actuate one or both of the deflector actuators 170A, 170B to iteratively increase the aggressiveness of the singulator 160. It should be understood that a singulator 160 may be operated to provide a range of aggressiveness settings. Generally, as described above, the higher the singulator aggressiveness setting, the smaller the distances 166A, 166B between the deflectors 160A. The range of aggressiveness settings of the singulator 160 (i.e., the range of the distances 166A, 166B) may be divided by discrete intervals, of equal or varying size, into several aggressiveness settings. An iterative increase is therefore intended to mean increasing the aggressiveness setting of the singulator 160 from a lower aggressiveness setting, corresponding to wider distances 166A, 166B, by a given interval to a higher aggressiveness setting, corresponding to smaller distances 166A, 166B. As such, several aggressiveness settings may be tested during calibration of the seed meter 100. In some embodiments, the aggressiveness setting may be increased between directly adjacent or consecutive iterative settings for the singulator 160. Alternatively, in some embodiments, the aggressiveness setting may be increased by several aggressiveness settings when an increase is determined to be necessary by the controller 202.

Following each iterative increase in the singulator aggressiveness setting, the controller 202 may wait a predetermined delay period before re-checking (at 406) whether the number of multiples at the increased aggressiveness setting is greater than the predetermined allowable multiples threshold. For instance, as indicated above, the predetermined delay period may be chosen based on the amount of seeds or operating time required for the seed meter 100 to reach steady state operation. In such instance, once the predetermined delay period has lapsed for a new aggressiveness setting, the controller 202 may continue to operate the seed meter for a given duration (e.g., for a given number of seeds, number of rotations of the seed transport member 116, or predetermined time period associated with the predetermined allowable multiples threshold) to allow the number of multiples to be re-assessed relative to the threshold.

Once it is detected that the number of multiples is less than or falls below the predetermined allowable multiples threshold at (406), the controller 202 may, at (410), be configured to assess whether the aggressiveness setting of the seed meter 100 operation satisfies a given operational threshold(s) associated with the number of seeds being released from the meter 100. For example as shown in FIG. 9, the controller 202 may, at (410), be configured to determine whether the number of skips detected by one of the sensors downstream of the singulator 160, e.g., by the post-singulation sensor 106 and/or the seed delivery sensor 80, is greater than or exceeds a predetermined allowable skips threshold. It should be appreciated that, as described above, in some embodiments, the number of skips and the number of occurrences of seed multiples may be detected by the same sensor, e.g., the seed delivery sensor 80, or may be detected by separate sensors. It should further be appreciated that the pre-singulation sensor 104 may be used to confirm whether the skips are occurring upstream of or before the singulator 160.

In the event that the number of skips is greater than the predetermined allowable skips threshold at the current singulator aggressiveness setting, the controller 202 may determine that the seed meter 100 cannot operate as desired and, at (412), indicate an error. More particularly, if the number of multiples at the current singulator aggressiveness is within the allowable multiples threshold, but the number of skips at the current singulator aggressiveness exceeds the allowable skips threshold, there is no range of singulator aggressiveness settings that can suitably meter the current seed type or seed lot being metered without adjusting the vacuum pressure.

Otherwise, in the event that the number of skips is less than the predetermined allowable skips threshold, the controller 202 may, at (414), be configured to record the current aggressiveness setting of the singulator 160 as a minimum acceptable aggressiveness setting for the seed meter 100. In this regard, the minimum acceptable aggressiveness setting may, for instance, correspond to the lowest aggressiveness setting for the seed meter 100 and the associated seed type at which the seed meter 100 can be operated while maintaining the number of multiples below the allowable threshold. As indicated above, the "initial aggressiveness setting" set at (404) may correspond, for example, to the widest possible setting for the singulator 160. In such instance, it would typically be expected that the number of multiples at such setting would be greater than the allowable multiples threshold. Thus, by iteratively increasing the singulator aggressiveness setting and re-assessing the performance of the seed meter at each iterative setting, the controller 202 may determine the minimum aggressiveness setting at which the operation of the seed meter 100 is acceptable in terms of the number of seed multiples.

Moreover, in addition to determining the minimum acceptable aggressiveness setting for the singulator 160, the controller 202 may also be configured to determine a maximum acceptable aggressiveness setting for the singulator 160 at which the seed meter operation satisfies a given operational threshold(s) associated with the number of seeds being released from the meter 100. For example as shown in FIG. 9, with the singulator 160 initially operating at the minimum aggressiveness setting recorded at (414), the controller 202 may, at (416), actuate one or both of the deflector actuators 170A, 170B to iteratively increase the singulator aggressiveness setting from the minimum aggressiveness setting. Thereafter, the controller 202 may, at (418), be configured to determine whether the number of skips is greater than or exceeds a predetermined allowable skips threshold.

In the event that the number of skips is less than or falls below the predetermined allowable skips threshold, the controller 202 may determine that the aggressiveness setting of the singulator 160 may be further increased and thus, at (416), actuate one or both of the deflector actuators 170A, 170B to iteratively increase the aggressiveness setting of the singulator 160. Thereafter, the controller 202 may wait a predetermined delay period, as described above, before re-checking (at 418) whether the number of skips at the increased aggressiveness setting of the singulator 160 is greater than the predetermined allowable skips threshold.

Once it is detected that the number of skips is greater than or exceeds the predetermined allowable skips threshold at (418), the controller 202 may, at (420), be configured to record the previous aggressiveness setting of the singulator 160 (i.e., the last aggressiveness setting applied before the skips threshold was exceeded) as a maximum acceptable aggressiveness setting for the seed meter 100. In this regard, the maximum acceptable aggressiveness setting may, for instance, correspond to the most aggressive setting for the singulator 160 and the associated seed type at which the seed meter 100 can be operated while maintaining the number of skips below the allowable threshold. Thus, by iteratively increasing the singulator aggressiveness setting and re-assessing the performance of the seed meter 100 at each higher iterative setting, the controller 202 may determine the maximum aggressiveness setting at which the operation of the seed meter 100 is acceptable in terms of the number of seed skips.

It should be appreciated that the controller 202 may be configured to perform one or more additional singulator calibration cycles to adjust or verify the minimum aggressiveness setting and/or the maximum aggressiveness setting determined during the initial singulator calibration cycle. For example, in some embodiments, the minimum aggressiveness settings determined during the initial singulator calibration cycle and any additional, follow-up calibration cycles may be averaged to calculate a final average minimum aggressiveness setting. Similarly, in some embodiments, the maximum aggressiveness settings determined during the initial singulator calibration cycle and any additional, follow-up calibration cycles may be averaged to calculate a final average maximum aggressiveness setting. However, the minimum and maximum aggressiveness settings from the various singulator calibration cycles may be otherwise analyzed or compared to determine final minimum and maximum aggressiveness settings for the singulator 160.

In addition to performing one or more additional singulator calibration cycles following the initial singulator calibration cycle (or as an alternative thereto), the controller 202 may be configured to perform a reverse singulator calibration cycle in which the steps of the calibration routine 400 are reversed to better account for hysteresis effects. For example, in the case of a reverse singulator calibration cycle following the determination of the maximum acceptable aggressiveness setting (e.g., at 416), the controller 202 may increase the aggressiveness setting by a given margin (e.g., 10% over the previously determined maximum acceptable aggressiveness setting) and then iteratively decrease the aggressiveness setting of the singulator 160 until it is detected that the number of skips is less than the predetermined allowable skips threshold, at which point the controller 202 may record the current aggressiveness setting currently as a second maximum acceptable aggressiveness setting. Thereafter, the controller 202 may further iteratively decrease the aggressiveness setting of the singulator 160 until the number of multiples is greater than the predetermined allowable multiples threshold and record the aggressiveness setting previously applied as a second minimum acceptable aggressiveness setting. By performing such a reverse calibration cycle, the controller 202 may further refine the specific aggressiveness settings associated with the minimum and maximum acceptable aggressiveness settings for the singulator 160.

Alternatively, in the case of a stand-alone reverse singulator calibration cycle in which the initial singulator aggressiveness setting corresponds to the maximum aggressiveness setting of the singulator 160, the controller 202 may similarly iteratively decrease the aggressiveness setting of the singulator 160 until it is detected that the number of skips is less than the predetermined allowable skips threshold, at which point the controller 202 may record the current aggressiveness setting currently as a maximum acceptable aggressiveness setting. Thereafter, the controller 202 may further iteratively decrease the aggressiveness setting of the singulator 160 until the number of multiples is greater than the predetermined allowable multiples threshold and record the aggressiveness setting previously applied as a minimum acceptable aggressiveness setting.

As a result of the above-described calibration routine 400, the controller 202 may define a target range of aggressiveness settings for the singulator 160, from the minimum acceptable aggressiveness setting to the maximum acceptable aggressiveness setting, in which skips and multiples are minimized within expectations. An appropriate operating aggressiveness setting for the singulator 160 may then be selected from the target aggressiveness setting range.

Figure 10:
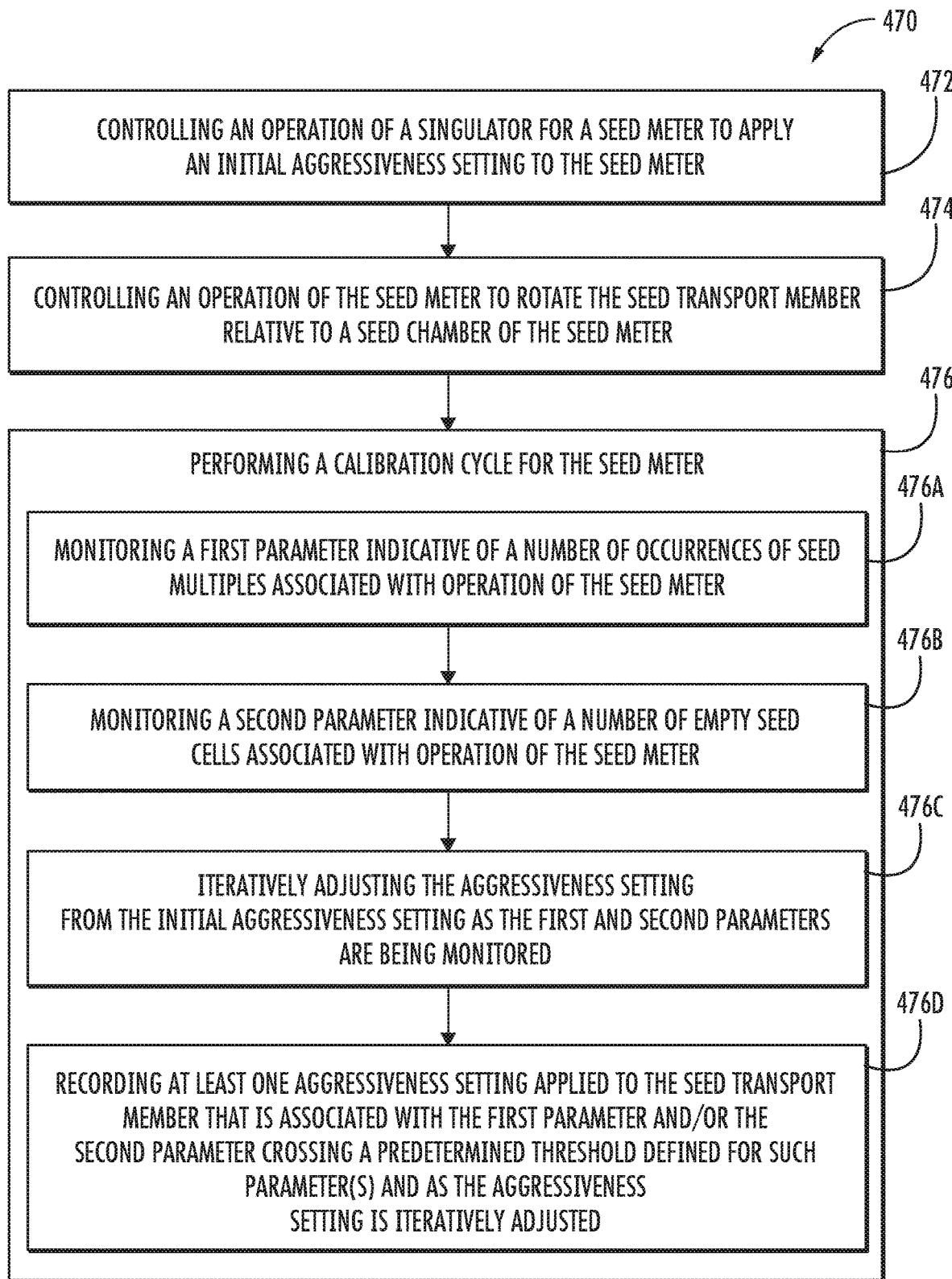
FIG. 10 illustrates a flow diagram of another embodiment of a method for calibrating a singulator of a seed meter in accordance with aspects of the present subject matter.

Referring now to FIG. 10, a flow diagram of another embodiment of a method 470 for automatically calibrating a seed singulator of a seed meter is illustrated in accordance with aspects of the present subject matter. In general, the method 470 will be described herein with reference to the system 200 described above with reference to FIG. 6. However, it should be appreciated by those of ordinary skill in the art that the disclosed method 470 may be implemented within any other system. In addition, although FIG. 10 depicts steps performed in a particular order for purposes of illustration and discussion, the method discussed herein is not limited to any particular order or arrangement. One skilled in the art, using the disclosures provided herein, will appreciate that various steps of the method disclosed herein can be omitted, rearranged, combined, and/or adapted in various ways without deviating from the scope of the present disclosure.

As shown in FIG. 10, at (472), the method 470 includes controlling an operation of a singulator for a seed meter to apply an initial aggressiveness setting to the seed meter. For example, as indicated above, at least one actuator 170A, 170B of the singulator 160 may be controlled by the controller 202 to apply an initial aggressiveness setting to the seed transport member 116 of the seed meter 100, particularly to seeds being carried within the seed cells 140 of the seed transport member 116.

Moreover, at (474), the method 470 includes controlling an operation of the seed meter to rotate the seed transport member relative to a seed chamber of the seed meter. For example, as indicated above, the controller 202 may control the operation of the meter drive member 122 to rotate the seed transport member 116 to pick up seeds from the seed chamber 124 of the seed meter 100.

Further, at (476), the method 470 includes performing a calibration cycle for the seed meter. For instance, as indicated above, the calibration cycle may be used to determine at least one of a minimum acceptable aggressiveness setting or a maximum acceptable aggressiveness setting to be applied by the singulator 160 to the seed meter 100.

As shown in FIG. 10, as part of the calibration cycle, the method 470 includes monitoring a first parameter indicative of a number of occurrences of seed multiples associated with operation of the seed meter at (476A). For example, as described above, the controller 202 may receive sensor data from one or more of the sensors downstream of the singulator 160, e.g., the seed delivery sensor 80, indicating a number of multiples occurring during operation of the seed meter 100 at a given singulator aggressiveness setting.

Additionally, as part of the calibration cycle, the method 470 includes monitoring a second parameter indicative of a number of empty seed cells associated with operation of the seed meter at (476B). For example, as described above, the controller 202 may receive sensor data from one or more of the sensors 80, 104, 106 indicating a number of skips occurring during operation of the seed meter 100 at a given singulator aggressiveness setting.

Further, as part of the calibration cycle, the method 470 includes, at (476C) iteratively adjusting the aggressiveness setting from the initial aggressiveness setting as the first and second parameters are being monitored. As described above, the controller 202 may, for example, control at least one actuator 170A, 170B of the singulator 160 to iteratively increase the aggressiveness of the singulator 160 from a lower aggressiveness setting to a higher aggressiveness setting while monitoring the number of skips and multiples detected by the sensor(s) 80, 104, 106.

Additionally, as part of the calibration cycle, the method 470 includes, at (476D), recording at least one aggressiveness setting applied to the seed transport member that is associated the first parameter and/or the second parameter crossing a predetermined threshold defined for such parameter(s) as the aggressiveness setting is iteratively adjusted. For example, as indicated above, the controller 202 may record a minimum acceptable aggressiveness setting associated with the number of multiples falling below an allowable multiples threshold and/or a maximum acceptable aggressiveness setting associated with the number of skips exceeding an allowable skips threshold.

Figure 11:
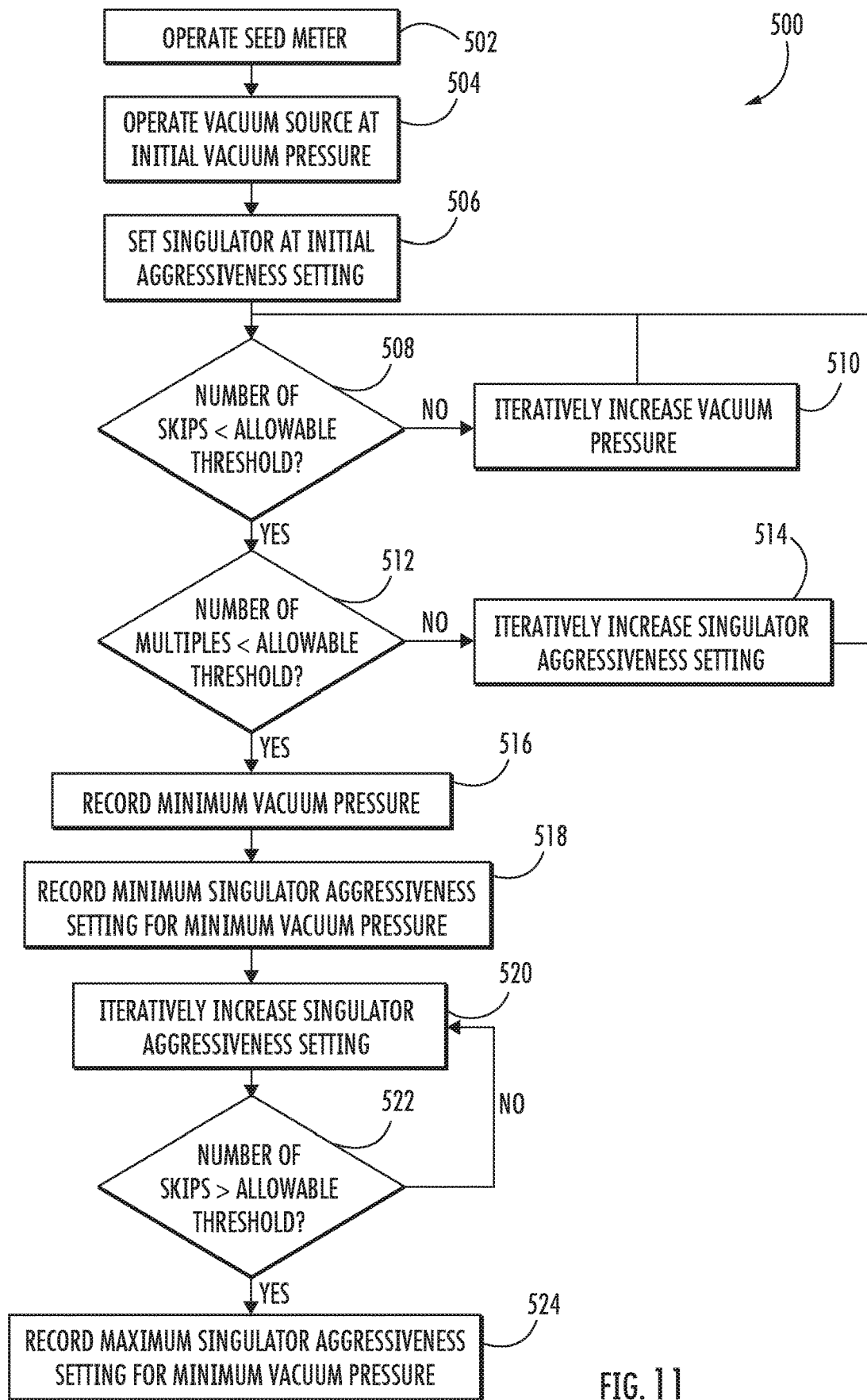
FIG. 11 illustrates a flow diagram of one embodiment of a control routine for calibrating both a vacuum source and a singulator of a seed meter in accordance with aspects of the present subject matter.

Referring now to FIG. 11, a flow diagram of one embodiment of a control algorithm or routine 500 that may be executed when automatically calibrating both a vacuum source and a singulator of a seed meter is illustrated in accordance with aspects of the present subject matter. In general, the control routine 500 will be described herein as being implemented by the controller 202 of the system 200 described above with reference to FIG. 6. However, it should be appreciated that the various processes described below may alternatively be implemented by another computing device or any combination of computing devices. In addition, although FIG. 11 depicts control steps or functions performed in a particular order for purposes of illustration, the control routines discussed herein are not limited to any particular order or arrangement. One skilled in the art, using the disclosures provided herein, will appreciate that the various steps or functions of the algorithms disclosed herein can be omitted, rearranged, combined, and/or adapted in various ways without deviating from the scope of the present disclosure.

As shown in FIG. 11, while the implement 10, row unit 18, and/or seed meter 100 is in a static position or is otherwise stationary, at (502), the controller 202 may be configured to control the meter drive member 122 of the seed meter 100 as described above to rotate the seed transport member 116 within the meter housing 110 relative to the seeds contained within the seed pool 125. Additionally, the controller 202 may control the vacuum source 70, at (504), to set the vacuum pressure of the vacuum source 70 at an initial vacuum pressure and to control the deflector actuator(s) 170A, 170B at (506) to set the aggressiveness setting of the singulator 160 at an initial aggressiveness setting. As indicated above, the initial vacuum pressure may correspond to the minimum vacuum setting for the vacuum source 70 and the initial aggressiveness setting may correspond to the least aggressive or passive aggressiveness setting of the singulator 160, as in the embodiment illustrated in FIG. 11.

Thereafter, the controller 202 may be configured to determine a minimum acceptable vacuum pressure of the vacuum source 70 at which the seed meter operation satisfies a given operational threshold(s) associated with the number of seeds being released from the meter 100. For example, as shown in FIG. 11, at (508), the controller 202 may be configured to assess whether the vacuum pressure is high enough to allow the seed transport member 116 to adequately pick-up seeds and transport such seeds to the release point for subsequent delivery to the seed tube 82. More particularly, the controller 202 may be configured to determine whether the number of skips detected by one of the sensors, e.g., by the pre-singulation sensor 104, the post-singulation sensor 106, and/or a seed delivery sensor 80, is less than or falls below a predetermined allowable skips threshold.

In the event that the number of skips is greater than or exceeds the predetermined allowable skips threshold, the controller 202 may be configured to determine that the vacuum pressure of the vacuum source 70 is not high enough. Thus, at (510), the controller 202 may control the vacuum source 70 to iteratively increase the vacuum pressure. For example, as indicated above, the controller 202 may iteratively increase the vacuum pressure from a lower vacuum pressure setting to a higher vacuum pressure setting. Following each iterative increase in the vacuum pressure, the controller 202 may wait a predetermined delay period, as described above, before re-checking whether the number of skips at the increased vacuum pressure of is greater than the predetermined allowable skips threshold.

Once it is detected that the number of skips is less than or falls below the predetermined allowable skips threshold at (508), the controller 202 may determine a minimum acceptable aggressiveness setting for the singulator 160. More particularly, the controller 202 may be configured to assess whether the current aggressiveness setting is aggressive enough to prevent the number of seed multiples from exceeding a given threshold. For example, as shown in FIG. 11, at (512), the controller 202 may be configured to determine whether the number of multiples detected by one of the sensor(s) downstream of the singulator 160, e.g., the seed delivery sensor 80, is less than or falls below a predetermined allowable multiples threshold, as described above.

In the event that the number of multiples is greater than or exceeds the predetermined allowable multiples threshold, the controller 202 may be configured to determine that the aggressiveness setting of the singulator 160 is not aggressive enough and, at (514), actuate one or both of the deflector actuators 170A, 170B to iteratively increase the aggressiveness of the singulator 160. Following each iterative increase in the singulator aggressiveness setting, the controller 202 may wait a predetermined delay period before re-checking at (508) whether the number of skips at the increased aggressiveness setting of the singulator 160 is greater than the predetermined allowable skips threshold.

Once it is detected that the number of skips is less than or falls below the predetermined allowable skips threshold at (508) and that the number of multiples is less than or falls below the predetermined allowable multiples threshold at (512), the controller 202 may, at (516), record the current vacuum pressure of the vacuum source 70 as a minimum acceptable vacuum pressure for the seed meter 100 and, at (518), be configured to record the current aggressiveness setting of the singulator 160 as a minimum acceptable aggressiveness setting for the seed meter 100 for the minimum vacuum pressure recorded at (516). Thus, by iteratively increasing the vacuum pressure and singulator aggressiveness setting and re-assessing the performance of the seed meter 100 for each iterative setting, the controller 202 may determine the minimum acceptable vacuum pressure setting and minimum aggressiveness setting at which the operation of the seed meter 100 is acceptable in terms of the number of skips and multiples.

Moreover, in addition to determining the combination of minimum acceptable aggressiveness setting for the singulator 160 and minimum vacuum pressure of the vacuum source 70, the controller 202 may also be configured to determine a maximum acceptable singulator aggressiveness setting of the singulator 160 at which the seed meter operation satisfies a given operational threshold(s) associated with the number of seeds being released from the meter 100. For example as shown in FIG. 11, with the singulator 160 initially operating at the minimum vacuum pressure recorded at (516) and the minimum acceptable aggressiveness setting recorded at (518), the controller 202 may, at (520), actuate one or both of the deflector actuators 170A, 170B to iteratively increase the singulator aggressiveness setting of the singulator 160. Thereafter, the controller 202 may wait a predetermined delay period, as described above before determining, at (522), whether the number of skips detected by one of the sensors downstream of the singulator 160, e.g., by the post-singulation sensor 106 or the seed delivery sensor 80, is greater than or exceeds the predetermined allowable skips threshold.

In the event that the number of skips is less than or falls below the predetermined allowable skips threshold, the controller 202 may be configured to determine that the aggressiveness setting of the singulator 160 may be higher and thus, at (520), actuate one or both of the deflector actuators 170A, 170B further iteratively increase the aggressiveness setting of the singulator 160. Thereafter, the controller 202 may wait a predetermined delay period, as described above, before re-checking (at 522) whether the number of skips at the increased aggressiveness setting of the singulator 160 is greater than the predetermined allowable skips threshold.

Once it is detected that the number of skips is greater than or exceeds the predetermined allowable skips threshold at (522), the controller 202 may, at (524), be configured to record the previous aggressiveness setting of the singulator 160 (i.e., the last aggressiveness setting applied before the skips threshold was exceeded) as a maximum acceptable aggressiveness setting for the seed meter 100 for the minimum vacuum pressure recorded at (516).

It should be appreciated that the controller 202 may further be configured to perform one or more additional vacuum calibration cycles and/or singulator calibration cycles, as indicated above, to adjust or verify the minimum acceptable vacuum pressure of the vacuum source 70 and the minimum acceptable aggressiveness setting and/or the maximum acceptable aggressiveness setting for the singulator 160 determined during the initial calibration cycle. In addition to performing one or more additional vacuum calibration cycles and/or singulator calibration cycles (or as an alternative thereto), the controller 202 may be configured to perform a reverse combined calibration cycle in which at least some of the steps of the calibration routine 500 are reversed to better account for hysteresis effects. For example, upon determining the maximum acceptable aggressiveness setting (e.g., at 524), the controller 202 may increase the aggressiveness setting by a given margin (e.g., 10% over the previously determined maximum acceptable aggressiveness setting) and then iteratively decrease the aggressiveness setting of the singulator 160 until it is detected that the number of skips is less than the predetermined allowable skips threshold, at which point the controller 202 may record the current aggressiveness setting currently as a second maximum acceptable aggressiveness setting. Thereafter, the controller 202 may further iteratively decrease the aggressiveness setting of the singulator 160 until the number of multiples is greater than the predetermined allowable multiples threshold and record the aggressiveness setting previously applied as a second minimum acceptable aggressiveness setting.

As a result of the above-described calibration routine 500, the controller 202 may define a target range of aggressiveness settings of the singulator 160, from the minimum acceptable aggressiveness setting to the maximum acceptable aggressiveness setting, for the determined minimum acceptable vacuum pressure, in which skips and multiples are minimized within expectations. An appropriate operating aggressiveness setting of the singulator 160 may then be selected from the target aggressiveness setting range for the minimum acceptable vacuum pressure. It should be appreciated that the control routine 500 may further determine a target range of aggressiveness settings for further (e.g., higher) vacuum pressures.

Figure 12:
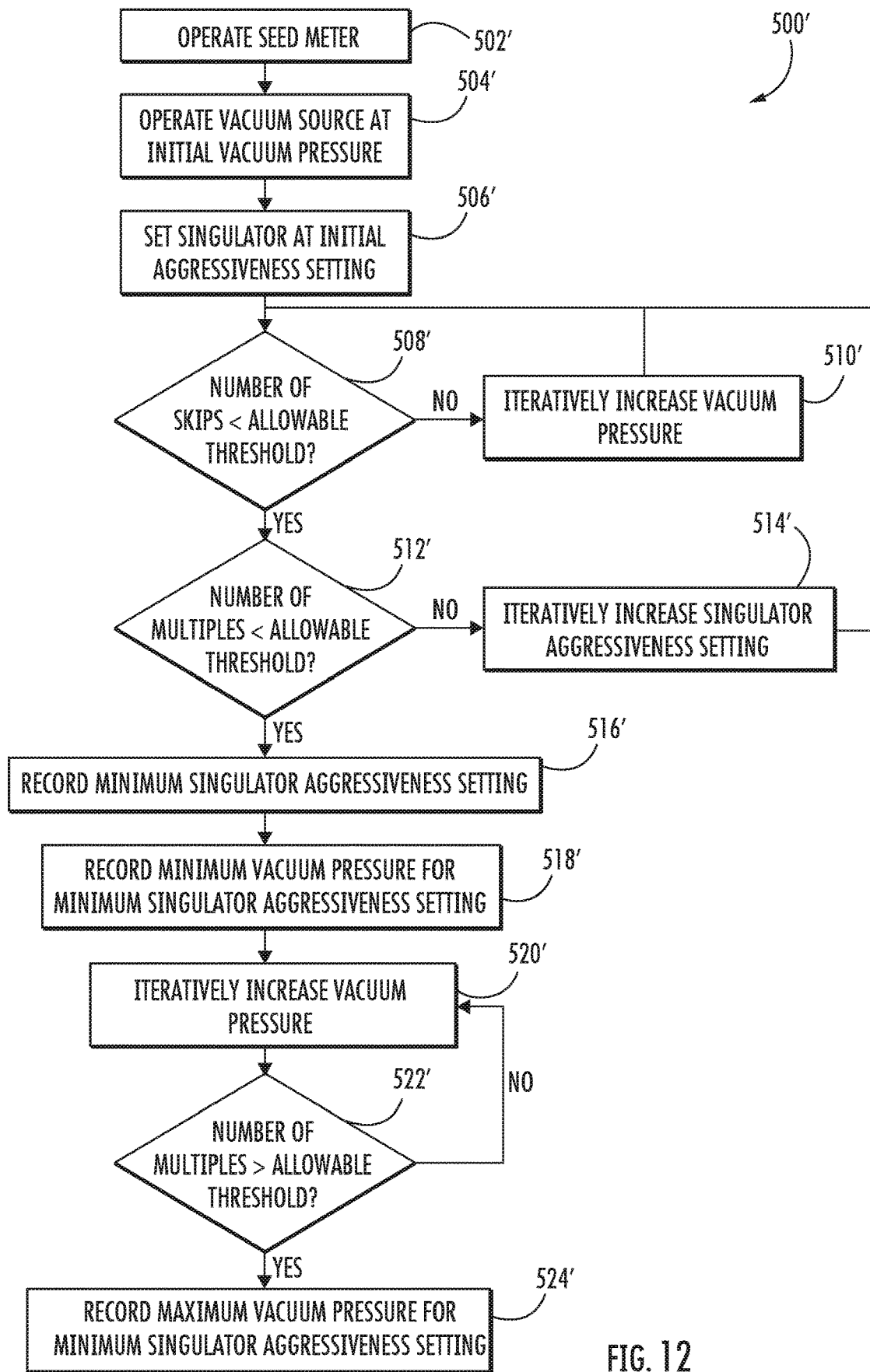
FIG. 12 illustrates a flow diagram of another embodiment of a control routine for calibrating both a vacuum source and a singulator of a seed meter in accordance with aspects of the present subject matter.

Referring now to FIG. 12, a flow diagram of another embodiment of a control routine 500' for calibrating both a vacuum source and a singulator of a seed meter in accordance with aspects of the present subject matter. In general, the control routine 500' will be described herein as being implemented by the controller 202 of the system 200 described above with reference to FIG. 6. However, it should be appreciated that the various processes described below may alternatively be implemented by another computing device or any combination of computing devices. In addition, although FIG. 12 depicts control steps or functions performed in a particular order for purposes of illustration, the control routines discussed herein are not limited to any particular order or arrangement. One skilled in the art, using the disclosures provided herein, will appreciate that the various steps or functions of the algorithms disclosed herein can be omitted, rearranged, combined, and/or adapted in various ways without deviating from the scope of the present disclosure.

It should be appreciated that elements or steps 502'-514' of control routine 500' are the same as or substantially the same as the elements or steps 502-514 of the control routine 500 described above with reference to FIG. 11. As such, for the sake of brevity, such elements or steps will not be described in details again with reference to FIG. 12.

As shown in FIG. 12, while the implement 10, row unit 18, and/or seed meter 100 is in a static position or is otherwise stationary, at (502'), the controller 202 may be configured to control the meter drive member 122 of the seed meter 100 as described above to rotate the seed transport member 116 within the meter housing 110 relative to the seeds contained within the seed pool 125. Additionally, the controller 202 may control the vacuum source 70, at (504'), to set the vacuum pressure of the vacuum source 70 at an initial vacuum pressure and to control the deflector actuator(s) 170A, 170B at (506') to set the aggressiveness setting of the singulator 160 at an initial aggressiveness setting. Thereafter, at (508'), the controller 202 may determine whether the number of skips detected by one of the sensors, e.g., by the pre-singulation sensor 104, the post-singulation sensor 106, and/or a seed delivery sensor 80, is less than or falls below a predetermined allowable skips threshold.

In the event that the number of skips is greater than or exceeds the predetermined allowable skips threshold, at (510'), the controller 202 may control the vacuum source 70 to iteratively increase the vacuum pressure. Once it is detected that the number of skips is less than or falls below the predetermined allowable skips threshold at (508'), the controller 202 may, at (512'), be configured to determine whether the number of multiples detected by one of the sensor(s) downstream of the singulator 160, e.g., the seed delivery sensor 80, is less than or falls below a predetermined allowable multiples threshold, as described above. In the event that the number of multiples is greater than or exceeds the predetermined allowable multiples threshold, the controller 202 may be configured to determine that the aggressiveness setting of the singulator 160 is not aggressive enough and, at (514'), actuate one or both of the deflector actuators 170A, 170B to iteratively increase the aggressiveness of the singulator 160.

Once it is detected that the number of skips is less than or falls below the predetermined allowable skips threshold at (508') and that the number of multiples is less than or falls below the predetermined allowable multiples threshold at (512'), the controller 202 may, at (516'), record the current aggressiveness setting of the singulator 160 as a minimum acceptable aggressiveness setting for the seed meter 100, and, at (518'), be configured to record the current vacuum pressure of the vacuum source 70 as a minimum acceptable vacuum pressure for the seed meter 100 for the minimum aggressiveness setting recorded at (516'). Thus, by iteratively increasing the vacuum pressure and singulator aggressiveness setting and re-assessing the performance of the seed meter 100 for each iterative setting, the controller 202 may determine the minimum acceptable vacuum pressure setting and minimum aggressiveness setting at which the operation of the seed meter 100 is acceptable in terms of the number of skips and multiples.

Moreover, in addition to determining the combination of minimum acceptable aggressiveness setting for the singulator 160 and minimum vacuum pressure of the vacuum source 70, the controller 202 may also be configured to determine a maximum acceptable y at which the seed meter operation satisfies a given operational threshold(s) associated with the number of seeds being released from the meter 100. For example as shown in FIG. 12, with the singulator 160 initially operating at the minimum aggressiveness setting recorded at (516') and the minimum vacuum pressure aggressiveness setting recorded at (518'), the controller 202 may, at (520'), control the vacuum source 70 to iteratively increase the vacuum pressure. Thereafter, the controller 202 may wait a predetermined delay period, as described above before determining, at (522'), whether the number of multiples is greater than or exceeds the predetermined allowable multiples threshold.

In the event that the number of skips is less than or falls below the predetermined allowable multiples threshold, the controller 202 may be configured to determine that the vacuum pressure of the vacuum source 70 may be higher and thus, at (520'), control the vacuum source 70 to further iteratively increase the vacuum pressure of the vacuum source 70. Thereafter, the controller 202 may wait a predetermined delay period, as described above, before re-checking (at 522') whether the number of multiples at the increased vacuum pressure of the vacuum source 70 is greater than the predetermined allowable skips threshold.

Once it is detected that the number of multiples is greater than or exceeds the predetermined allowable multiples threshold at (522'), the controller 202 may, at (524'), be configured to record the previous vacuum pressure of the vacuum source 70 (i.e., the last vacuum pressure applied before the multiples threshold was exceeded) as a maximum acceptable vacuum pressure for the seed meter 100 for the minimum singulator aggressiveness setting recorded at (516').

It should be appreciated that the controller 202 may further be configured to perform one or more additional vacuum calibration cycles and/or singulator calibration cycles, as indicated above, to adjust or verify the minimum acceptable vacuum pressure of the vacuum source 70 and the minimum acceptable aggressiveness setting and/or the maximum acceptable vacuum pressure for the vacuum source 70 determined during the initial calibration cycle. In addition to performing one or more additional vacuum calibration cycles and/or singulator calibration cycles (or as an alternative thereto), the controller 202 may be configured to perform a reverse combined calibration cycle in which at least some of the steps of the calibration routine 500' are reversed to better account for hysteresis effects. For example, upon determining the maximum acceptable vacuum pressure (e.g., at 524'), the controller 202 may increase the vacuum pressure by a given margin (e.g., 10% over the previously determined maximum acceptable vacuum pressure) and then iteratively decrease the vacuum pressure of the vacuum source 70 until it is detected that the number of multiples is less than the predetermined allowable multiples threshold, at which point the controller 202 may record the current vacuum pressure currently as a second maximum acceptable vacuum pressure. Thereafter, the controller 202 may further iteratively decrease the vacuum pressure of the vacuum source 70 until the number of skips is greater than the predetermined allowable skips threshold and record the vacuum pressure previously applied as a second minimum acceptable vacuum pressure.

As a result of the above-described calibration routine 500', the controller 202 may define a target range of vacuum pressures of the vacuum source 70, from the minimum acceptable vacuum pressure to the maximum acceptable vacuum pressure, for the determined minimum acceptable aggressiveness setting of the singulator 160, in which skips and multiples are minimized within expectations. An appropriate operating vacuum pressure of the vacuum source 70 may then be selected from the target vacuum pressure range for the minimum acceptable aggressiveness setting of the singulator 160. It should be appreciated that the control routine 500' may further determine a target range of vacuum pressures for further (e.g., higher) singulator aggressiveness settings.

Figure 13:
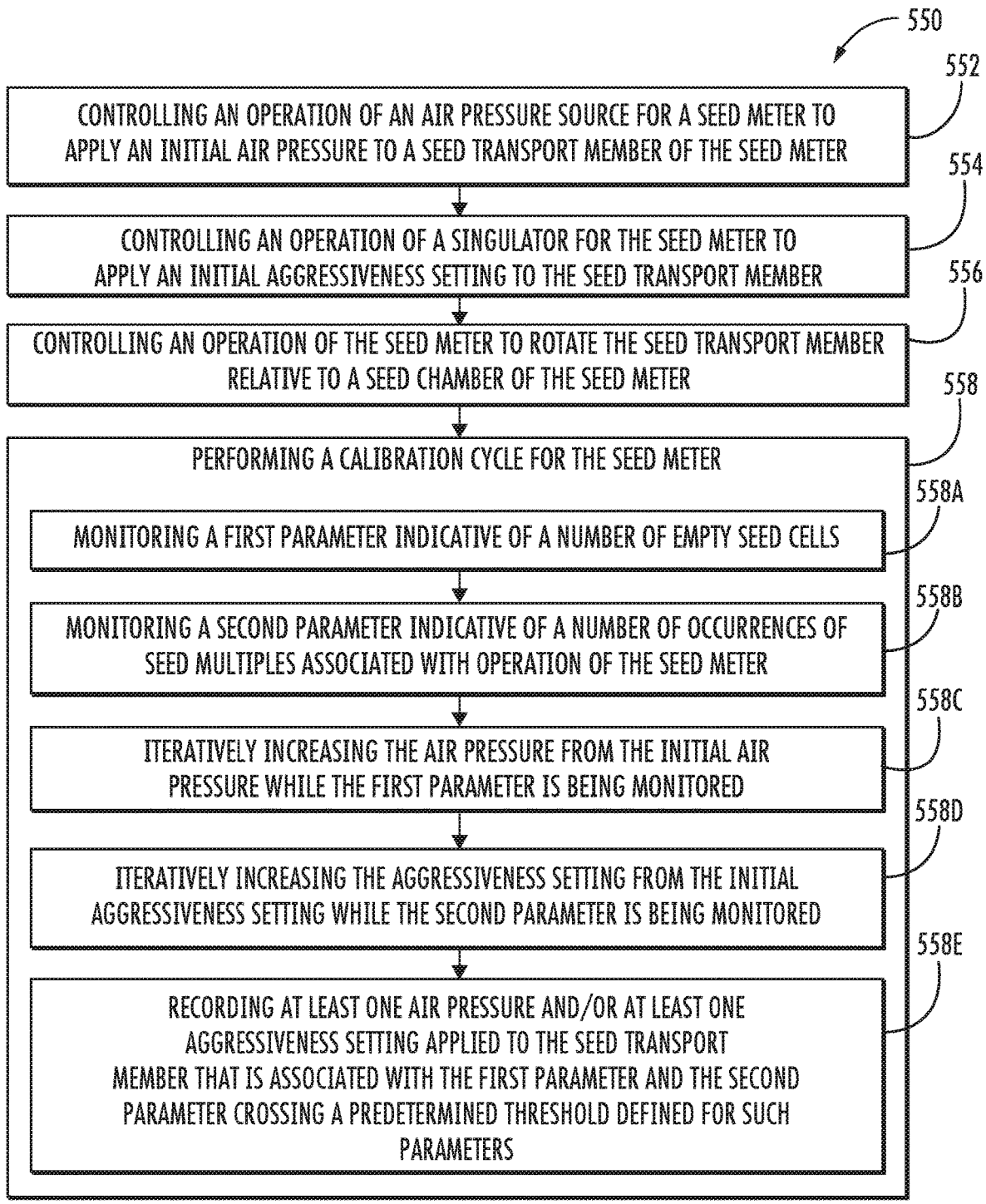
FIG. 13 illustrates a flow diagram of one embodiment of a method for calibrating both a vacuum source and a singulator of a seed meter in accordance with aspects of the present subject matter.

Referring now to FIG. 13, a flow diagram of one embodiment of a method 550 for automatically calibrating both an air pressure source and seed singulator of a seed meter is illustrated in accordance with aspects of the present subject matter. In general, the method 550 will be described herein with reference to the system 200 described above with reference to FIG. 6. However, it should be appreciated by those of ordinary skill in the art that the disclosed method 550 may be implemented within any other system. In addition, although FIG. 13 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 13, at (552), the method 550 includes controlling an operation of an air pressure source for a seed meter to apply an initial air pressure to a seed transport member of the seed meter. For example, as indicated above, the vacuum source 70 may be controlled by the controller 202 to apply an initial vacuum pressure to the seed cells 140 of the seed transport member 116 of the seed meter 100.

Moreover, at (554), the method 550 includes controlling an operation of a singulator for the seed meter to apply an initial aggressiveness setting to seeds within the seed transport member. For example, as indicated above, the controller 202 may control at least one actuator 170A, 170B of the singulator 160 to apply an initial aggressiveness setting to seeds within the seed transport member 116 of the seed meter 100.

Further, at (556), the method 550 includes controlling an operation of the seed meter to rotate the seed transport member relative to a seed chamber of the seed meter. For example, as indicated above, the controller 202 may control the operation of a meter drive member 122 to rotate the seed transport member 116 to pick up seeds from the seed chamber 124 of the seed meter 100.

The method 550 further includes, at (558), performing a calibration cycle for the seed meter. For instance, as indicated above, the calibration cycle may be used to determine at least one of a minimum acceptable vacuum pressure of the vacuum source 70 or a minimum acceptable aggressiveness setting of the singulator 160.

As shown in FIG. 13, as part of the calibration cycle, the method 550 includes, at (558A), monitoring a first parameter indicative of a number of empty seed cells. For example, as described above, the controller 202 may receive sensor data from one or more of the sensors 80, 104, 106 indicating a number of seed skips occurring during operation of the seed meter 100 at a given vacuum pressure.

Further, the method 550 includes, at (558B), as part of the calibration cycle, monitoring a second parameter indicative of a number of occurrences of seed multiples associated with operation of the seed meter. For example, as described above, the controller 202 may receive sensor data from one or more of the sensors downstream of the singulator 160, e.g., the seed delivery sensor 80, indicating a number of multiples during operation of the seed meter 100 at a given singulator aggressiveness setting and vacuum pressure.

Additionally, as part of the calibration cycle, at (558C), the method 550 includes iteratively increasing the air pressure from the initial air pressure while the first parameter is being monitored. As described above, the controller 202 may control the vacuum source 70 to increase the vacuum pressure from a lower vacuum pressure step or setting to a higher vacuum pressure step while monitoring the number of skips detected by the sensor(s) 80, 105, 106.

Moreover, at (558D), the method 550 includes, as part of the calibration cycle, iteratively increasing the aggressiveness setting from the initial aggressiveness setting while the second parameter is being monitored. As described above, the controller 202 may control the vacuum source 70 to increase the vacuum pressure from a lower vacuum pressure setting to a higher vacuum pressure setting while monitoring the number of skips and multiples detected by the sensor(s) 80, 104, 106.

Additionally, at (558E), the method 550 includes, as part of the calibration cycle, recording at least one air pressure and/or at least one aggressiveness setting for the seed meter 100 that is associated with the first parameter and the second parameter crossing a predetermined threshold defined for such parameters. For example, as indicated above, the controller 202 may record a minimum acceptable aggressiveness setting associated with the detected number of multiples falling below an allowable multiples threshold and the detected number of skips falling below an allowable skips threshold. Alternatively, or additionally, as indicated above, the controller 202 may record a minimum acceptable vacuum pressure associated with the detected number of multiples falling below an allowable multiples threshold.

Figure 14:
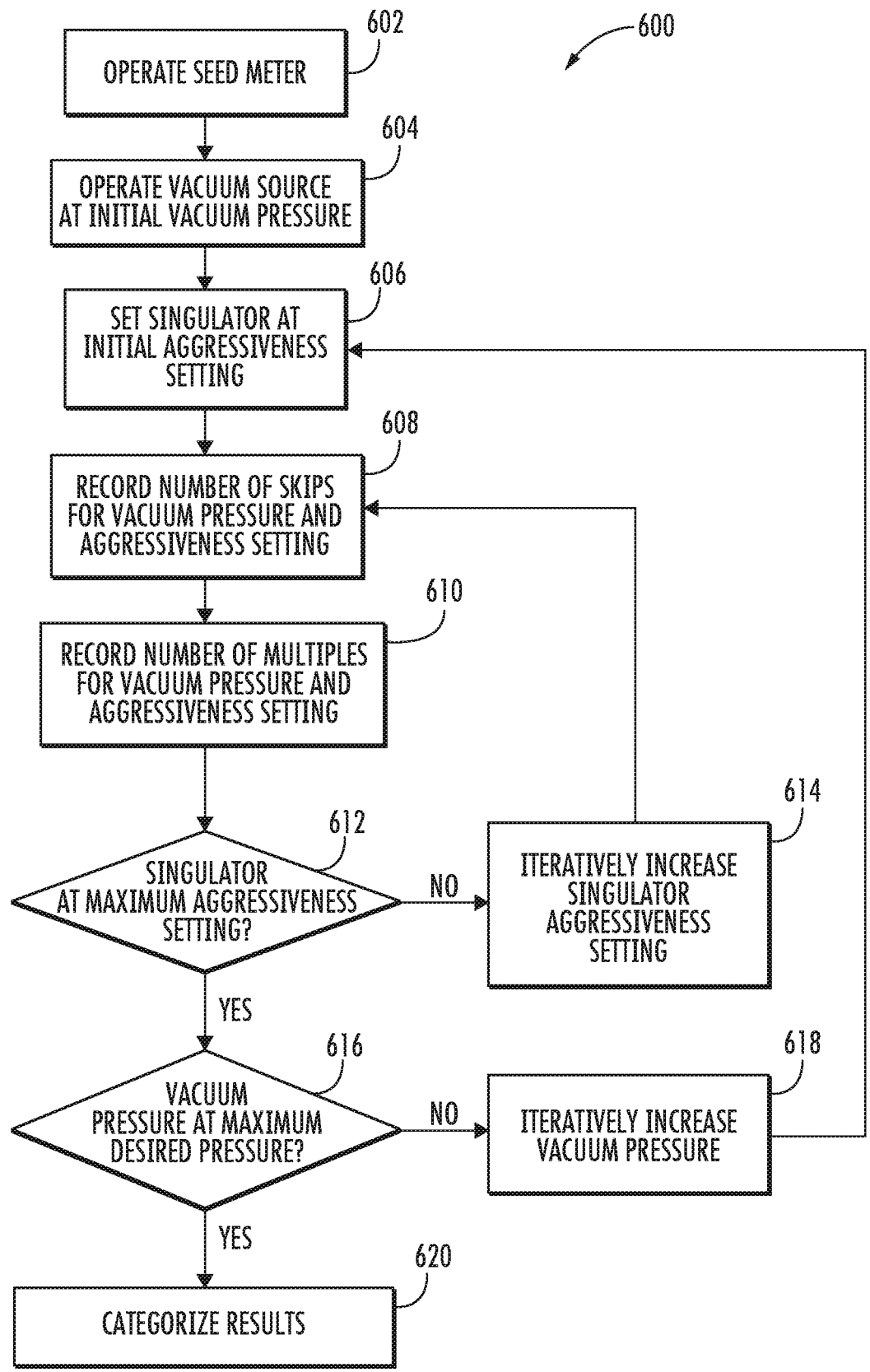
FIG. 14 illustrates a flow diagram of another embodiment of a control routine for calibrating a vacuum source and a singulator of a seed meter in accordance with aspects of the present subject matter.

Referring now to FIG. 14, a flow diagram of another embodiment of a control algorithm or routine 600 that may be executed when automatically calibrating both a vacuum source and a singulator of a seed meter is illustrated in accordance with aspects of the present subject matter. In general, the control routine 600 will be described herein as being implemented by the controller 202 of the system 200 described above with reference to FIG. 6. However, it should be appreciated that the various processes described below may alternatively be implemented by another computing device or any combination of computing devices. In addition, although FIG. 14 depicts control steps or functions performed in a particular order for purposes of illustration, the control routines discussed herein are not limited to any particular order or arrangement. One skilled in the art, using the disclosures provided herein, will appreciate that the various steps or functions of the algorithms disclosed herein can be omitted, rearranged, combined, and/or adapted in various ways without deviating from the scope of the present disclosure.

As shown in FIG. 14, while the implement 10, row unit 18, and/or seed meter 100 is in a static position or otherwise stationary, at (602), the controller 202 may be configured to control the meter drive member 122 as described above to rotate the seed transport member 116 within the meter housing 110 relative to the seeds contained within the seed pool 125. Additionally, the controller 202 may further control the vacuum source 70, at (604), to set the vacuum pressure of the vacuum source 70 at an initial vacuum pressure and the deflector actuator(s) 170A, 170B, at (606), to set the aggressiveness setting of the singulator 160 at an initial aggressiveness setting.

Thereafter, at (608) the controller 202 may be configured to record the number of skips detected by one of the sensors, e.g., by the pre-singulation sensor 104, the post-singulation sensor 106, and/or a seed delivery sensor 80, and further, at (610), to record the number of multiples detected by one of the sensors, e.g., by the seed delivery sensor 80.

The controller 202 may further be configured to determine the number of skips and multiples that occur with further combinations of the vacuum pressure and singulator aggressiveness settings applied to the seed transport member 116 of the seed meter 100. For example, at (612), the controller 202 may be configured to determine if the singulator 160 is at its maximum aggressiveness setting (i.e., where the distances 166A, 166B are smallest and the singulator 160 is most aggressive). Once it is determined that the singulator 160 is not at its maximum aggressive setting at (612), the controller 202 may be configured, at (614), to iteratively increase the aggressiveness setting. For example, the controller 202 may be configured to actuate one or both of the deflector actuators 170A, 170B to increase the aggressiveness setting of the actuator 160. For each iterative increase in aggressiveness setting at (614) until the singulator is at its maximum aggressiveness setting at (612), the controller 202 may be configured to record the number of skips detected (e.g., at 608) and record the number of multiples detected (e.g., at 610).

Once the singulator 160 has reached its most aggressive setting at (612), the controller 202 may then be configured, at (616), to determine if the vacuum pressure is at its maximum desired pressure. The higher the vacuum pressure of the vacuum source 70, the more energy required to operate the vacuum source 70 and the more wear on the vacuum source 70 and related parts of the seed meter 100. As such, "maximum desired pressure" is intended to mean the highest vacuum pressure of the vacuum source 70 to be tested. In some embodiments, the maximum desired pressure may be lower than the highest possible vacuum pressure of the vacuum source 70.

When it is determined, at (616), that the vacuum pressure is not at its maximum desired pressure, the controller 202 may be configured, at (618), to iteratively increase the vacuum pressure. For example, the controller 202 may be configured to control the vacuum source 70 to iteratively increase the vacuum pressure from its initial vacuum pressure. For each iterative increase in the vacuum pressure, the controller 202 may further be configured to actuate the one or both actuators 170A, 170B of singulator 160 to again set the singulator 160 at its initial aggressiveness setting (e.g., at 606). In addition, the controller 202 may be configured to record the number of skips detected (e.g., at 608) and the number of multiples detected (e.g., at 610) for each iterative aggressiveness setting of the singulator (e.g., at 614), as indicated above, until a number of skips and a number of multiples has been recorded for each combination of vacuum pressure and singulator aggressiveness. It should be appreciated that, as indicated above, after any adjustment in vacuum pressure and/or singulator setting, the controller 202 may be configured to wait for a predetermined delay period to lapse before recording the number of skips or multiples of each combination of vacuum pressure and/or singulator setting.

In the event that the vacuum pressure is at its maximum desired pressure, the controller 202 may be configured to categorize or otherwise analyze the results of all the tested combinations of vacuum pressure and singulator aggressiveness settings at (620). In one embodiment, the controller 202 may categorize the results of the tested combinations to at least help determine the sensitivity of the seed type to vacuum pressure and to singulator aggressiveness. For instance, in some embodiments, the controller 202 may generate a heat map of the results or may "bin" the results to highlight the combinations of vacuum pressure and singulator aggressiveness that have skips and multiples within, close to, or far from acceptable limits, such as the allowable skips threshold and the allowable multiples threshold described above, to help determine the sensitivity of the seed type. In some embodiments, added weight or preference may be given to combinations with lower vacuum pressures within the acceptable limits to improve the overall efficiency of the row unit 28. Thereafter, in some embodiments, the controller 202 may suggest, for the seed type, one or more suitable combinations of vacuum pressure and singulator aggressiveness setting, or a target range for the vacuum pressure and a target range for the singulator aggressiveness, based on the categorized results.

Alternatively, or additionally, the controller 202 may analyze the results of the tested combinations of vacuum pressure and singulator aggressiveness settings to determine a relationship(s) between the vacuum pressure and singulator aggressiveness setting for a given seed type. For example, the controller 202 may generate a mathematical relationship between the vacuum pressure and singulator aggressiveness setting using one or more techniques, such as linear regression, polynomial regression, logistic regression, Bayesian inference, K-nearest neighbor, fuzzy classification, and/or the like. Thereafter, in some embodiments, the controller 202 may display, such as via the user interface 220, the determined relationship(s) and/or one or more acceptable combinations of vacuum pressure and singulator aggressiveness corresponding to the determined relationship(s) to an operator. The controller 202 may further rank or bin such acceptable combinations based on efficiency or optimization.

It should further be appreciated that the controller 202 may perform one or more additional calibration cycles to adjust or verify the number of skips and multiples determined during the initial calibration cycle for each combination before categorizing or analyzing the results. For example, in some embodiments, the number of skips determined during the initial calibration cycle and any additional, follow-up calibration cycles may be averaged to calculate a final average number of skips. Similarly, the number of multiples determined during the initial calibration cycle and any additional, follow-up calibration cycles may be averaged to calculate a final average number of multiples. However, the number of skips and multiples from the various calibration cycles may be otherwise analyzed or compared to determine final numbers of skips and multiples for the seed meter 100.

Figure 15:
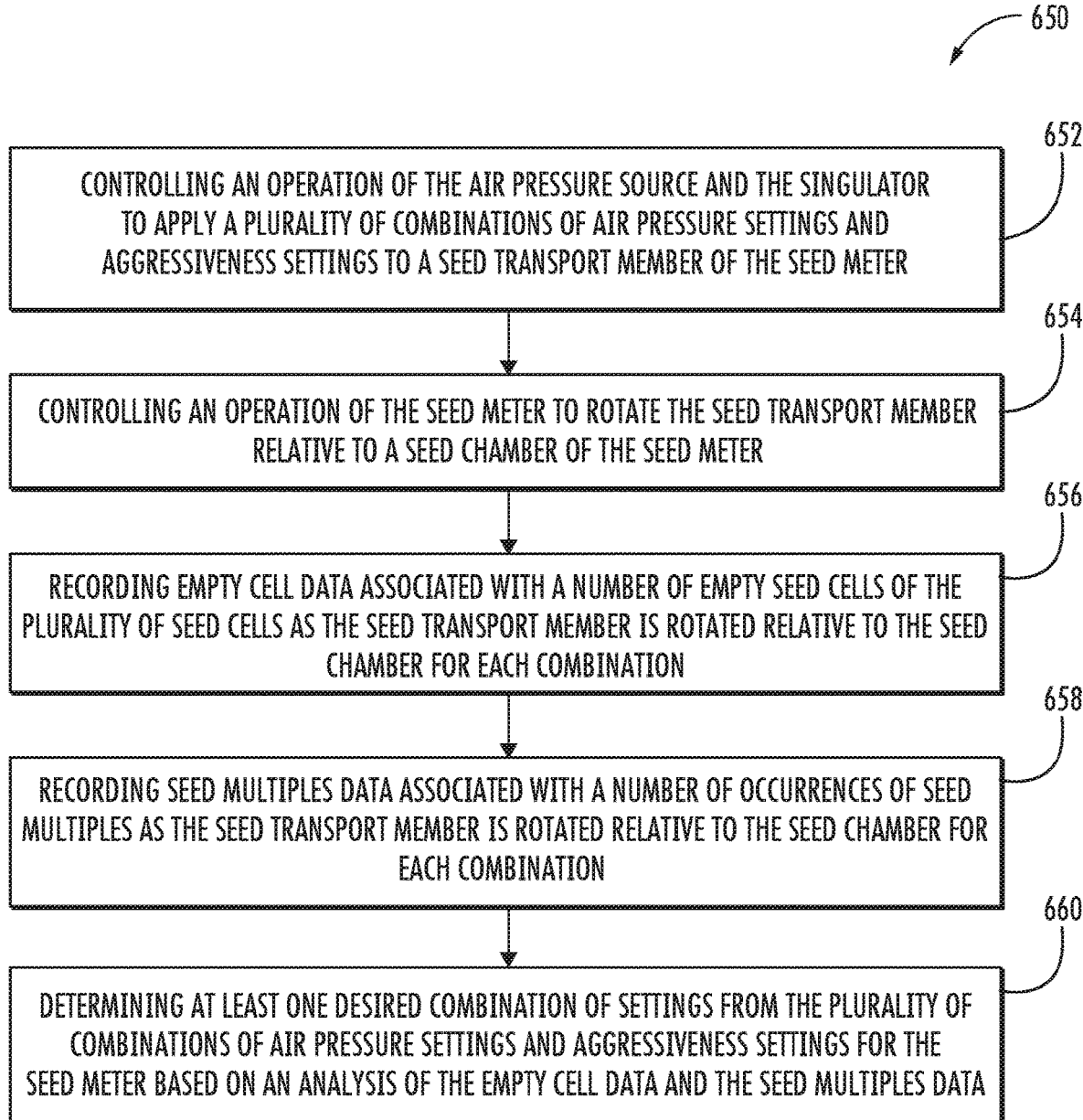
FIG. 15 illustrates a flow diagram of another embodiment of a method for calibrating a vacuum source and a singulator of a seed meter in accordance with aspects of the present subject matter.

Referring now to FIG. 15, a flow diagram of another embodiment of a method 650 for automatically calibrating both an air pressure source and seed singulator of a seed meter is illustrated in accordance with aspects of the present subject matter. In general, the method 650 will be described herein with reference to the system 200 described above with reference to FIG. 6. However, it should be appreciated by those of ordinary skill in the art that the disclosed method 650 may be implemented within any other system. In addition, although FIG. 15 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 15, at (652), the method 650 includes automatically controlling an operation of the air pressure source and the singulator to apply a plurality of combinations of air pressure settings and aggressiveness settings to a seed transport member of the seed meter. For example, as indicated above, the vacuum source 70 may be operable to provide a plurality of vacuum pressure settings the singulator 160 may similarly be adjustable to provide a plurality of aggressiveness settings. The controller 202 may be configured to apply a plurality of combinations of vacuum pressure settings and aggressiveness settings to the seed transport member 116 of the seed meter 100, where each vacuum/singulator combination of the plurality of combinations has a combination of one vacuum pressure setting of the plurality of vacuum pressure settings and one aggressiveness setting of the plurality of aggressiveness settings.

Moreover, at (654), the method 650 includes controlling an operation of the seed meter to rotate the seed transport member relative to a seed chamber of the seed meter. For example, as indicated above, the controller 202 may control the operation of a meter drive member 122 to rotate the seed transport member 116 to pick up seeds from the seed chamber 124 of the seed meter 100.

Further, at (656), the method 650 includes recording empty cell data associated with a number of empty seed cells of the plurality of seed cells as the seed transport member is rotated relative to the seed chamber for each combination. As indicated above, the controller 202 may receive sensor data from one or more of the sensors 80, 104, 106 that indicates a number of skips for each vacuumsingulator combination of the plurality of combinations of vacuum pressure settings and aggressiveness settings as the seed transport member 116 is rotated relative to the seed chamber 124.

At (658), the method 650 further includes recording seed multiples data associated with a number of occurrences of seed multiples as the seed transport member is rotated relative to the seed chamber for each setting combination. As indicated above, the controller 202 may receive sensor data from one or more sensors downstream of the singulator 160, e.g., the seed delivery sensor 80, that indicates a number of multiples for each vacuum/singulator combination of the plurality of combinations of vacuum pressure settings and aggressiveness settings as the seed transport member 116 is rotated relative to the seed chamber 124.

Additionally, at (660), the method 650 may include determining at least one desired combination of settings from the plurality of combinations of air pressure settings and aggressiveness settings for the seed meter based on an analysis of the empty cell data and the seed multiples data. For example, as described above, the controller 202 may be configured to categorize the plurality of combinations of vacuum pressure settings and aggressiveness settings by their associated number of skips and multiples. The controller 202 may, for example, bin the results or create a heat map according to closeness to one or more thresholds such as the allowable skip threshold and/or the allowable multiples threshold. The controller 202 may then determine at least one desired combination of vacuum pressure setting and aggressiveness setting from the plurality of categorized combinations of vacuum pressure settings and aggressiveness settings.

It should be appreciated that, while the steps of the routines 300, 400, 500, 500', 600 are described with reference to a system having vacuum or negative pressures supplied by a vacuum pressure source, the same methods 300, 400, 500, 500', 600 may also be applied to a system having positive pressure supplied by a suitable positive pressure source.

It is to be understood that, in several embodiments, the steps of the routines 300, 40, 500, 500', 600 and methods 370, 470, 550, 650 are performed by the controller 202 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, in several embodiments, any of the functionality performed by the controller 202 described herein, such as the routines 3), 400, 500, 500', 600 and methods 370, 470, 550, 650, are implemented in software code or instructions which are tangibly stored on a tangible computer readable medium. The controller 202 loads the software code or instructions via a direct interface with the computer readable medium or via a wired and/or wireless network. Upon loading and executing such software code or instructions by the controller 202, the controller 202 may perform any of the functionality of the controller 202 described herein, including any steps of the routines 300, 400, 500, 500', 600 and methods 370, 470, 550, 650 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A calibration method for a seed meter of an agricultural implement, the method comprising:
   controlling, with a computing device, an operation of an air pressure source for a seed meter to apply an initial air pressure to a seed transport member of the seed meter, the seed transport member defining a plurality of seed cells;
   controlling, with the computing device, an operation of the seed meter to rotate the seed transport member relative to a seed chamber of the seed meter, the seed chamber containing a plurality of seeds; and
   performing, with the computing device, a calibration cycle for the seed meter, the calibration cycle comprising:
      monitoring, with the computing device, a first parameter indicative of a number of empty seed cells of the plurality of seed cells as the seed transport member is rotated relative to the seed chamber;
      iteratively adjusting, with the computing device, the air pressure applied to the seed transport member from the initial air pressure as the first parameter is being monitored; and
      when it is detected that the first parameter crosses a first threshold, recording, with the computing device, the associated air pressure as a minimum air pressure for the seed meter.

2. The method of claim 1, wherein the calibration cycle further comprises:
   monitoring, with the computing device, a second parameter indicative of a number of occurrences of seed multiples associated with operation of the seed meter as the seed transport member is rotated relative to the seed chamber;
   iteratively adjusting, with the computing device, the air pressure applied to the seed transport member from the minimum air pressure as the second parameter is being monitored; and
   when the second parameter crosses a second threshold, recording, with the computing device, the associated air pressure as a maximum air pressure for the seed meter.

3. The method of claim 2, further comprising determining, with the computing device, a target range for the air pressure of the air pressure source based at least in part on the minimum air pressure and the maximum air pressure.

4. The method of claim 2, further comprising:
   executing, with the computing device, one or more additional calibration cycles for the seed meter;
   comparing, with the computing device, the minimum air pressures and the maximum air pressures determined for the calibration cycle and for each of the one or more additional calibration cycles; and
   determining, with the computing device, a target range for the air pressure of the air pressure source based at least in part on the comparison of the minimum air pressures and the maximum air pressures determined for the calibration cycle and for each of the one or more additional calibration cycles.

5. The method of claim 4, wherein each iterative adjustment of the calibration cycle is an iterative increase,
   wherein the one or more additional calibration cycles may include at least one reverse air pressure calibration cycle, each iterative adjustment of the at least one reverse air pressure calibration cycle being an iterative decrease.

6. The method of claim 2, wherein a first sensor is configured to detect the first parameter indicative of the number of empty seed cells of the plurality of seed cells, and a second sensor is configured to detect the second parameter indicative of the number of occurrences of seed multiples being released from the seed transport member, the first sensor differing from the second sensor.

7. The method of claim 6, wherein the first sensor comprises at least one of a pre-singulation sensor or a post-singulation sensor, and the second sensor comprises a seed delivery sensor.

8. The method of claim 2, wherein a common sensor is configured to detect the first and second parameters.

9. The method of claim 1, further comprising controlling, with the computing device, an operation of a singulator for the seed meter to apply an initial aggressiveness setting for the singulator,
   wherein the calibration cycle further comprises:
      monitoring, with the computing device, a second parameter indicative of a number of occurrences of seed multiples associated with operation of the seed meter as the seed transport member is rotated relative to the seed chamber;

iteratively adjusting, with the computing device, the aggressiveness setting for the singulator from the initial aggressiveness setting as the second parameter is being monitored and as air pressure is applied to the seed transport member; and when it is detected that the second parameter crosses a second threshold, recording, with the computing device, the associated aggressiveness setting as a minimum aggressiveness setting for the singulator.

10. The method of claim 9, wherein the calibration cycle further comprises:

iteratively adjusting, with the computing device, the aggressiveness setting for the singulator from the initial aggressiveness setting as the first parameter is being monitored and as air pressure is applied to the seed transport member; and when it is detected that the first parameter crosses the first threshold, recording, with the computing device, the associated aggressiveness setting as a maximum aggressiveness setting for the singulator.

11. The method of claim 9, wherein the initial aggressiveness setting for the singulator corresponds to an aggressiveness setting within a passive range of aggressiveness settings for the singulator, the singulator not contacting seeds being carried by the seed transport member when at the aggressiveness settings of the passive range.

12. The method of claim 1, further comprising:

executing, with the computing device, one or more additional calibration cycles for the seed meter;

comparing, with the computing device, the minimum air pressures determined for the calibration cycle and the one or more additional calibration cycles; and determining, with the computing device, an adjusted minimum air pressure based at least in part on the comparison of the minimum air pressures determined for the calibration cycle and the one or more additional calibration cycles.

13. The method of claim 1, wherein the initial air pressure corresponds to a minimum air pressure setting for the air pressure source.

14. The method of claim 1, wherein the implement is stationary during the performance of the calibration cycle.

15. A calibration method for a seed meter of an agricultural implement, the method comprising:

controlling, with a computing device, an operation of an air pressure source for a seed meter to apply an initial air pressure to a seed transport member of the seed meter, the seed transport member defining a plurality of seed cells;

controlling, with the computing device, an operation of the seed meter to rotate the seed transport member relative to a seed chamber of the seed meter, the seed chamber containing a plurality of seeds; and performing, with the computing device, a calibration cycle for the seed meter, the calibration cycle comprising:

monitoring, with the computing device, a first parameter indicative of a number of empty seed cells of the plurality of seed cells as the seed transport member is rotated relative to the seed chamber;

monitoring, with the computing device, a second parameter indicative of a number of occurrences of seed multiples associated with operation of the seed meter as the seed transport member is rotated relative to the seed chamber;

iteratively adjusting, with the computing device, the air pressure applied to the seed transport member from the initial air pressure as the first and second parameters are being monitored; and recording, with the computing device, at least one air pressure applied to the seed transport member that is associated with at least one of the first parameter or the second parameter crossing a predetermined threshold defined for the at least one of the first parameter or the second parameter as the air pressure is iteratively adjusted.

16. The method of claim 15, wherein the air pressure applied to the seed transport member is recorded as a minimum air pressure of the at least one air pressure when the first parameter crosses a first threshold.

17. The method of claim 15, wherein the air pressure applied to the seed transport member is recorded as a maximum air pressure of the at least one air pressure when the second parameter crosses a second threshold.

18. The method of claim 15, further comprising:

executing, with the computing device, one or more additional calibration cycles for the seed meter;

comparing, with the computing device, the air pressures associated with the at least one of the first parameter or the second parameter crossing the predetermined threshold defined for the at least one of the first parameter or the second parameter determined for the calibration cycle and each of the one or more additional calibration cycles; and determining, with the computing device, at least one adjusted air pressure for the air pressure of the air pressure source based at least in part on the comparison.

19. The method of claim 15, wherein the initial air pressure corresponds to a minimum air pressure setting for the air pressure source.

20. A calibration method for a seed meter of an agricultural implement, the method comprising:

controlling, with a computing device, an operation of an air pressure source for a seed meter to apply an initial air pressure to a seed transport member of the seed meter, the seed transport member defining a plurality of seed cells;

controlling, with the computing device, an operation of a singulator for the seed meter to apply an initial aggressiveness setting for the singulator;

controlling, with the computing device, an operation of the seed meter to rotate the seed transport member relative to a seed chamber of the seed meter, the seed chamber containing a plurality of seeds; and performing, with the computing device, a calibration cycle for the seed meter, the calibration cycle comprising:

monitoring, with the computing device, a first parameter indicative of a number of empty seed cells of the plurality of seed cells as the seed transport member is rotated relative to the seed chamber;

monitoring, with the computing device, a second parameter indicative of a number of occurrences of seed multiples associated with operation of the seed meter as the seed transport member is rotated relative to the seed chamber;

incrementally adjusting, with the computing device, the air pressure from the initial air pressure applied to the seed transport member while the first parameter is being monitored;

incrementally adjusting, with the computing device, the aggressiveness setting from the initial aggressiveness setting for the singulator while the second parameter is being monitored; and recording, with the computing device, the air pressure applied to the seed transport member that is associated with the first parameter crossing a predetermined threshold defined for the first parameter and the second parameter crossing a predetermined threshold defined for the second parameter as a minimum air pressure.

* * * * *